US009330107B1

(12) United States Patent
Kesselman et al.

(10) Patent No.: US 9,330,107 B1
(45) Date of Patent: May 3, 2016

(54) SYSTEM AND METHOD FOR STORING METADATA FOR A FILE IN A DISTRIBUTED STORAGE SYSTEM

(71) Applicant: Google Inc., Mountain View, CA (US)

(72) Inventors: Alexander Kesselman, Sunnyvale, CA (US); Angus Lees, Pyrmont (AU); Dmitry Broyde, San Jose, CA (US); Michael O'Reilly, Pyrmont (AU)

(73) Assignee: GOOGLE INC., Mountain View, CA (US)

(*) Notice: Subject to any disclaimer, the term of this patent is extended or adjusted under 35 U.S.C. 154(b) by 52 days.

(21) Appl. No.: 13/761,115

(22) Filed: Feb. 6, 2013

Related U.S. Application Data

(60) Provisional application No. 61/596,659, filed on Feb. 8, 2012.

(51) Int. Cl.
*G06F 17/30* (2006.01)

(52) U.S. Cl.
CPC ................................ *G06F 17/30194* (2013.01)

(58) Field of Classification Search
None
See application file for complete search history.

(56) References Cited

U.S. PATENT DOCUMENTS

| | | | | |
|---|---|---|---|---|
| 2002/0055972 | A1* | 5/2002 | Weinman, Jr. | 709/203 |
| 2003/0033308 | A1* | 2/2003 | Patel et al. | 707/10 |
| 2007/0016822 | A1* | 1/2007 | Rao et al. | 714/4 |
| 2007/0156842 | A1* | 7/2007 | Vermeulen et al. | 709/217 |
| 2010/0332664 | A1* | 12/2010 | Yevmenkin et al. | 709/227 |
| 2012/0166394 | A1* | 6/2012 | Kim et al. | 707/634 |
| 2013/0103729 | A1* | 4/2013 | Cooney et al. | 707/831 |

* cited by examiner

*Primary Examiner* — Kimberly Wilson
*Assistant Examiner* — Pedro J Santos
(74) *Attorney, Agent, or Firm* — Morgan, Lewis & Bockius LLP

(57) ABSTRACT

A system, computer-readable storage medium storing at least one program, and a computer-implemented method for storing metadata for a file in a distributed storage system is presented. Metadata for a file is generated. A subset of metadata clusters in a distributed storage system is identified to form a quorum of metadata clusters. Requests to store the metadata for the file on the metadata clusters in the distributed storage system are issued, where the requests include high priority requests to store the metadata for the file on at least one of the metadata clusters in the quorum of metadata clusters and normal priority requests to store the metadata in the remaining metadata clusters, the metadata being stored on the at least one of the metadata clusters in the quorum of metadata clusters before being stored on the remaining metadata clusters.

23 Claims, 19 Drawing Sheets

Exemplary Server Allocation

| | Task / Function | Typical Number of Servers at an Instance |
|---|---|---|
| 502 | Blobmaster | 10 |
| 504 | Bitpusher | 100 |
| 506 | BigTable Servers | 50 |
| 508 | File System Servers | 1000 |
| 510 | Tape Servers | 10 |
| 512 | Tape Master | 5 |
| 514 | Replication Management | 10 |
| 516 | Quorum Clock Server | 5 |

Figure 5

SYSTEM AND METHOD FOR STORING METADATA FOR A FILE IN A DISTRIBUTED STORAGE SYSTEM

RELATED APPLICATIONS

This application claims priority to U.S. Provisional Patent Application No. 61/596,659 filed Feb. 8, 2012, entitled "System and Method for Storing Metadata for a File in a Distributed Storage System," which application is incorporated by reference herein in its entirety.

TECHNICAL FIELD

The disclosed implementations relate generally to storing metadata for a file in a distributed storage system.

BACKGROUND

The enterprise computing landscape has recently undergone a fundamental shift in storage architectures in which the central-service architecture has given way to distributed storage systems. Distributed storage systems built from commodity computer systems can deliver high performance, availability, and scalability for new data-intensive applications at a fraction of cost compared to monolithic disk arrays. To unlock the full potential of distributed storage systems, data is replicated across multiple instances of the distributed storage system at different geographical locations, thereby increasing availability and reducing network distance from clients.

In a distributed storage system, when an object (e.g., a file) is uploaded to a first instance (e.g., a first storage cluster) of the distributed storage system, the object is replicated to other instances of the distributed storage system to balance the load across the distributed storage system, to provide low-latency access to objects (e.g., objects are replicated to geographically distributed storage clusters), and/or to ensure redundancy in case of the unavailability of particular instances of the distributed storage system. After uploading the object to the first instance, a request may be received from a client to obtain the object from the distributed storage system. However, a second instance of the distributed storage system may be the instance that services the request to obtain the object from the distributed storage system. If the request for the object was received before a time when metadata for the file (e.g., the metadata includes a location of the file in the distributed storage system) was replicated to the second instance of the distributed storage system, the object may appear to not be in the distributed storage system.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 5 illustrates a typical allocation of instance servers to various programs or processes, according to some implementations.

DETAILED DESCRIPTION

The implementations described herein provide techniques for storing metadata for a file in a distributed storage system. However, before discussing techniques for storing metadata for a file in a distributed storage system, it is instructive to present an example system in which these techniques may be used.

Distributed Storage System Overview

Figure 1A:
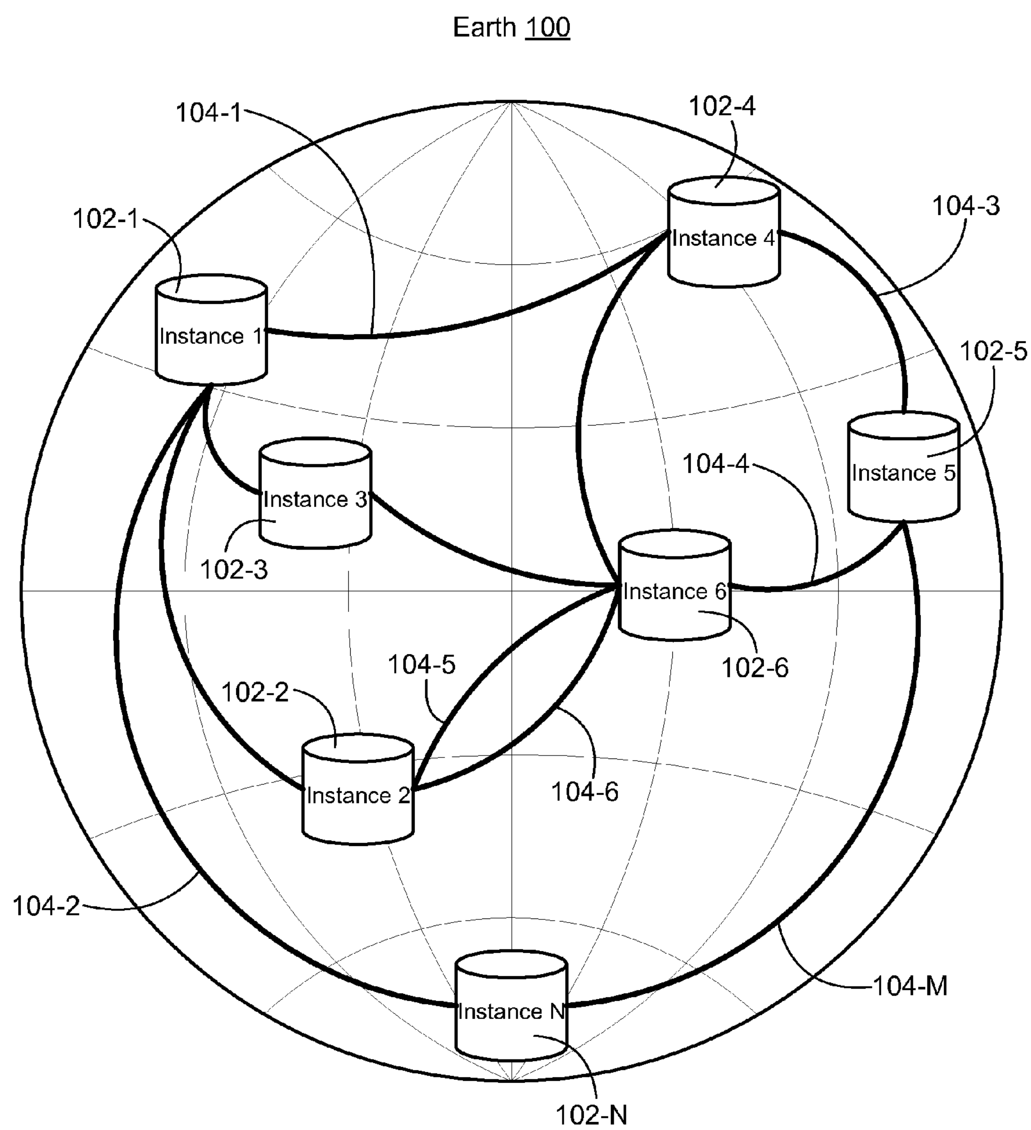
FIG. 1A is a conceptual illustration for placing multiple instances of a database at physical sites all over the globe, according to some implementations.
Figure 2:
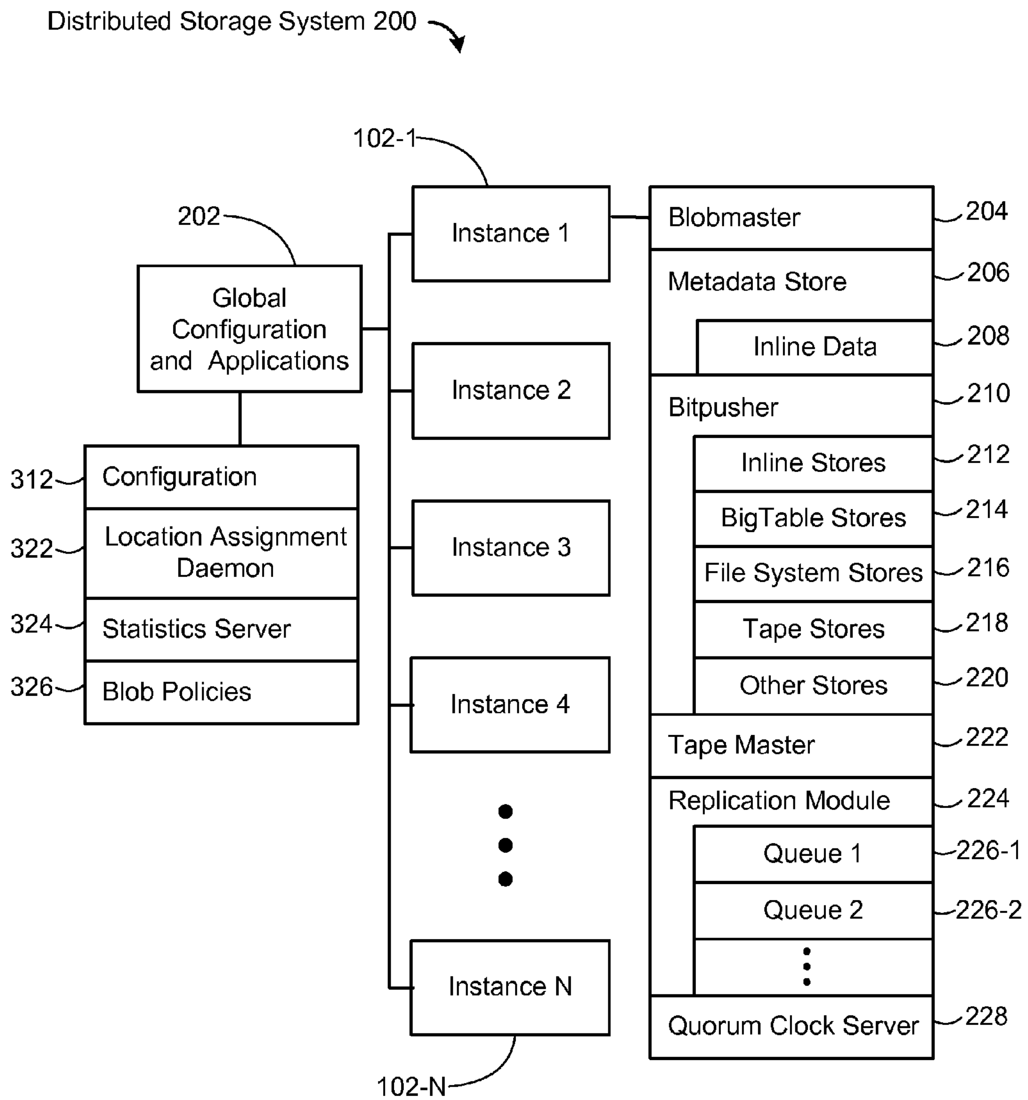
FIG. 2 is a block diagram illustrating multiple instances of a replicated database, with an example set of programs and/or processes shown for the first instance according to some implementations.
Figure 3:
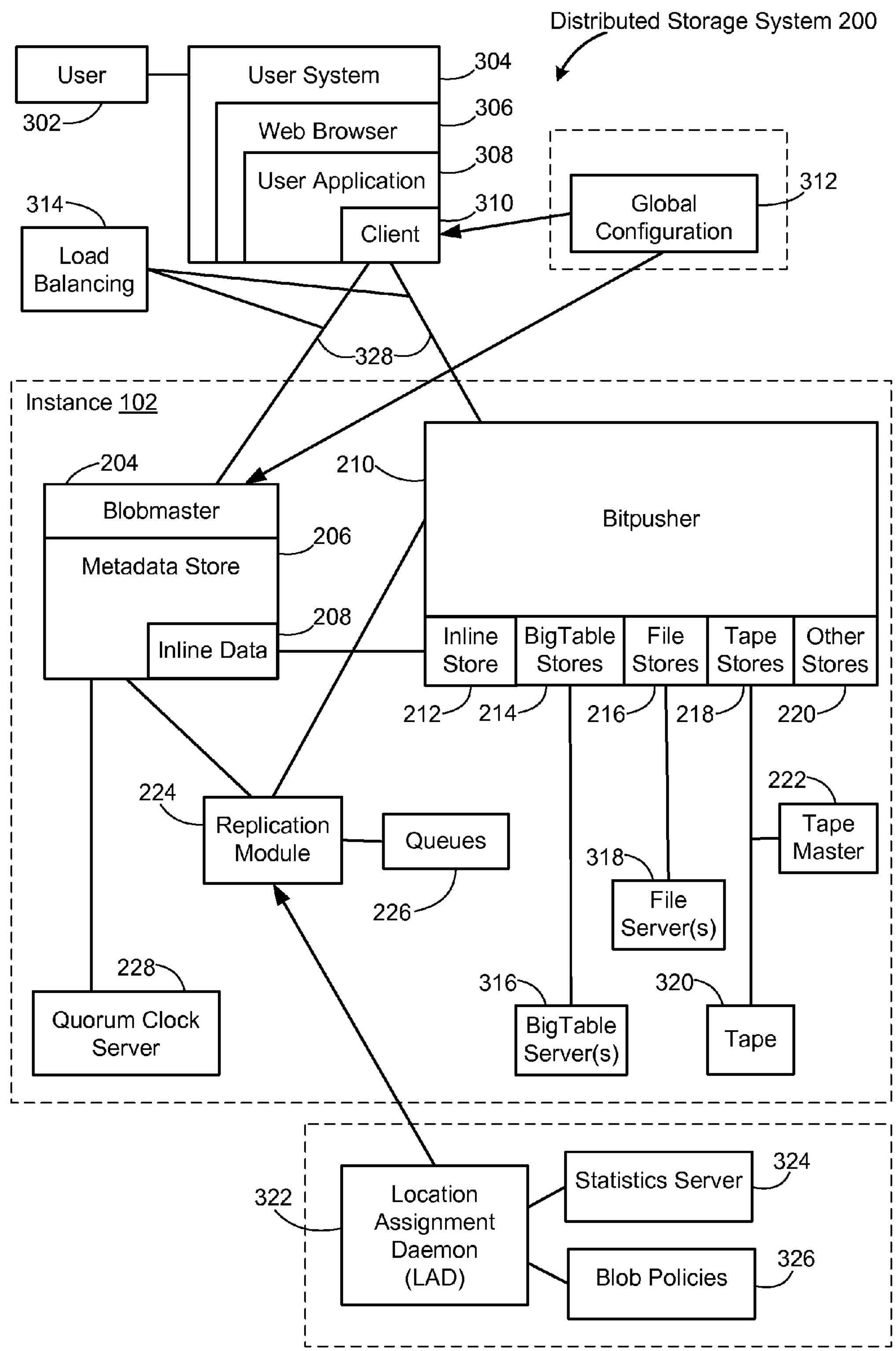
FIG. 3 is a block diagram that illustrates an example instance for the system, and illustrates what blocks within the instance with which a user interacts, according to some implementations.

The present specification describes a distributed storage system. In some implementations, as illustrated in FIG. 1A, the distributed storage system is implemented on a global or planet-scale. In these implementations, there is a plurality of instances 102-1, 102-2, . . . 102-N at various locations on the Earth 100, connected by network communication links 104-1, 104-2, . . . 104-M. In some implementations, an instance (such as instance 102-1) corresponds to a data center. In other implementations, multiple instances are physically located at the same data center. Although the conceptual diagram of FIG. 1A shows a limited number of network communication links 104-1, etc., typical implementations would have many more network communication links. In some implementations, there are two or more network communication links between the same pair of instances, as illustrated by communication links 104-5 and 104-6 between instance 2 (102-2) and instance 6 (102-6). In some implementations, the network communication links are composed of fiber optic cable. In some implementations, some of the network communication links use wireless technology, such as microwaves. In some implementations, each network communication link has a specified bandwidth and/or a specified cost for the use of that bandwidth. In some implementations, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some implementations, there are one or more instances that have limited functionality, such as acting as a repeater for data transmissions between other instances. Limited functionality instances may or may not have any of the data stores depicted in FIGS. 3 and 4.

Figure 1B:
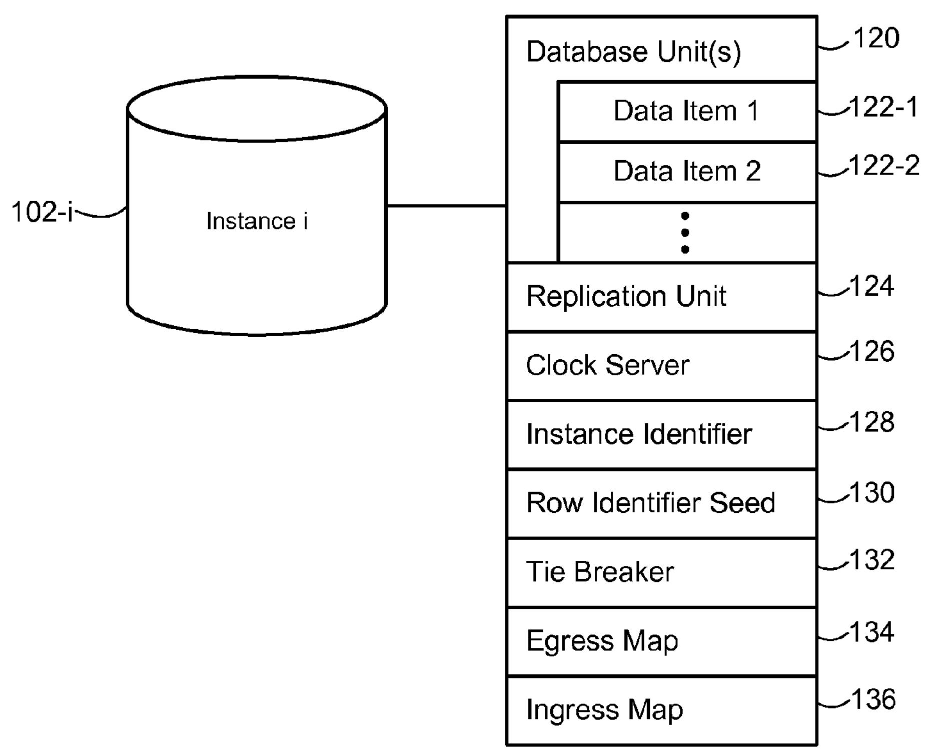
FIG. 1B illustrates basic functionality at each instance according to some implementations.

FIG. 1B illustrates data and programs at an instance 102-*i* that store and replicate data between instances. The underlying data items 122-1, 122-2, etc. are stored and managed by one or more database units 120. Each instance 102-*i* has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail with respect to FIGS. 14A-14D, 15A, and 17 of U.S. patent application Ser. No. 12/703,167, "Method and System for Efficiently Replicating Data in Non-Relational Databases," filed Feb. 9, 2010, which is incorporated herein by reference in its entirety.

Each instance 102-*i* has one or more clock servers 126 that provide accurate time. In some implementations, the clock servers 126 provide time as the number of microseconds past a well-defined point in the past. In some implementations, the clock servers provide time readings that are guaranteed to be monotonically increasing. In some implementations, each instance 102-*i* stores an instance identifier 128 that uniquely identifies itself within the distributed storage system. The instance identifier may be saved in any convenient format, such as a 32-bit integer, a 64-bit integer, or a fixed length character string. In some implementations, the instance identifier is incorporated (directly or indirectly) into other unique identifiers generated at the instance. In some implementations, an instance 102-*i* stores a row identifier seed 130, which is used when new data items 122 are inserted into the database. A row identifier is used to uniquely identify each data item 122. In some implementations, the row identifier seed is used to create a row identifier, and simultaneously incremented, so that the next row identifier will be greater. In other implementations, unique row identifiers are created from a timestamp provided by the clock servers 126, without the use of a row identifier seed. In some implementations, a tie breaker value 132 is used when generating row identifiers or unique identifiers for data changes (described with respect to FIG. 6-9 of U.S. patent application Ser. No. 12/703,167, "Method and System for Efficiently Replicating Data in Non-Relational Databases," filed Feb. 9, 2010, which is incorporated herein by reference in its entirety. In some implementations, a tie breaker value 132 is stored permanently in non-volatile memory (such as a magnetic or optical disk).

The elements described in FIG. 1B are incorporated in implementations of the distributed storage system 200 illustrated in FIGS. 2 and 3. In some implementations, the functionality described in FIG. 1B is included in a blobmaster 204 and metadata store 206. In these implementations, the primary data storage (i.e., blobs) is in the inline data stores 212, the BigTable stores 214, the file system stores 216, the tape stores 218, and the other stores 220, and managed by bitpushers 210. The metadata for the blobs is in the metadata store 206, and managed by the blobmaster 204. The metadata corresponds to the functionality identified in FIG. 1B. Although the metadata for storage of blobs provides an example implementation of the present invention, one of ordinary skill in the art would recognize that the present invention is not limited to this implementation.

In some implementations the disclosed distributed storage system 200, the distributed storage system is used by one or more user applications 308, which are provided by application servers, such as application servers 150-1, 150-2, 150-3, 150-4, and 150-5 illustrated in FIGS. 1C-1G. Example user applications that use implementations of the disclosed distributed storage system include Gmail, YouTube, Orkut, Google Docs, and Picasa. Some implementations of the disclosed distributed storage system simultaneously provide storage for multiple distinct user applications, and impose no limit on the number of distinct user applications that can use the distributed storage system. For example, a single implementation of the disclosed distributed storage system may provide storage services for all of the example user applications listed above. In some implementations, a user application 308 runs in a web browser 306, on a user computer system 304. A user 302 interacts with a user application 308 according to the interface provided by the user application. Each user application 308 uses a client library 310 to store and retrieve data from the distributed storage system 200.

Figure 1C:
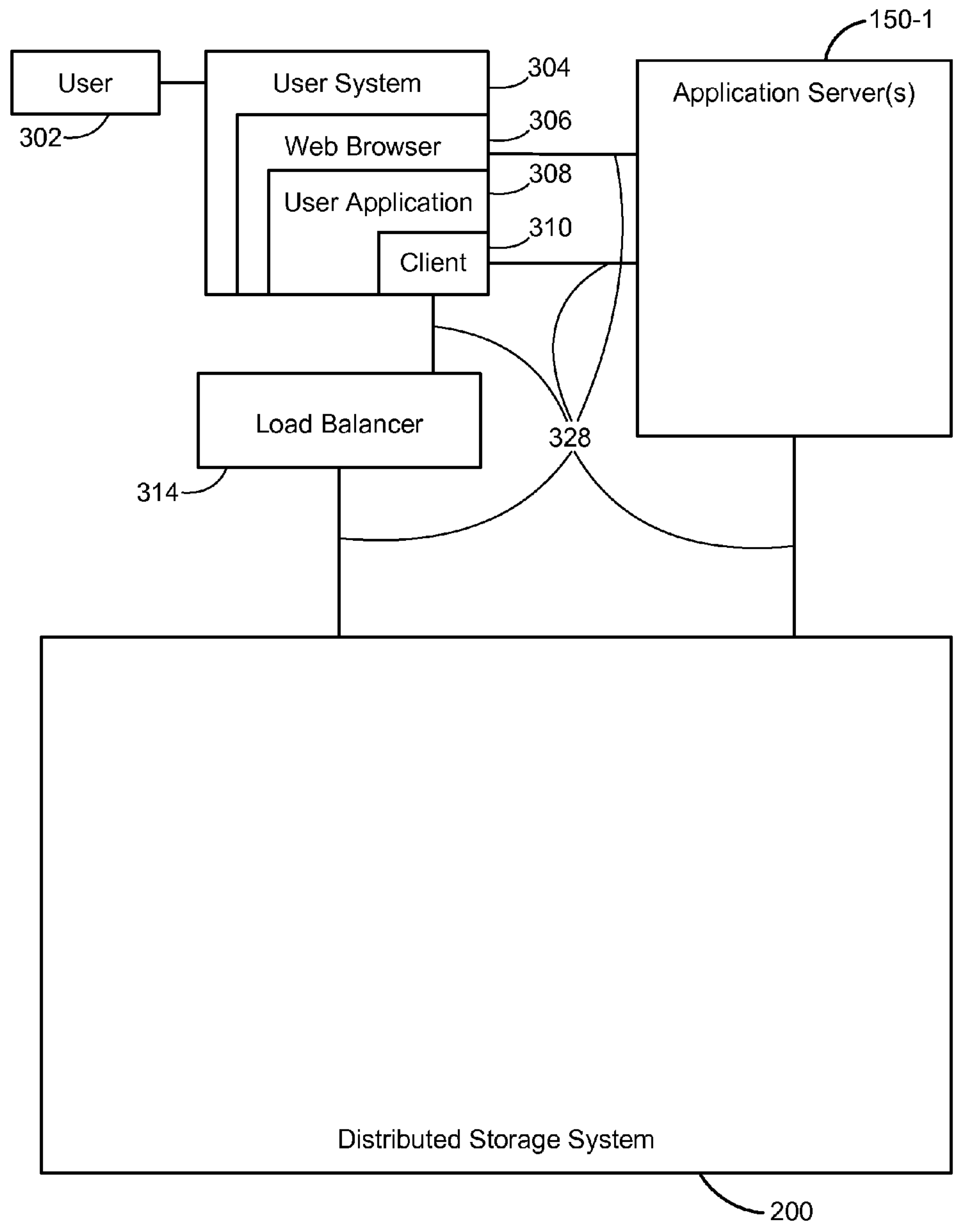
FIGS. 1C-1G illustrate ways that a distributed storage system may be integrated with systems that provide user applications according to some implementations.

FIG. 1C illustrates an implementation in which a user application is provided by one or more application servers 150-1. In some implementations, the web browser 306 downloads user application 308 over a network 328 from the application servers 150-1. In addition to communication between the application server 150-1 and the user system 304, the application server(s) 150-1 communicate over network 328 with the distributed storage system 200. In particular, the application servers may establish blob policies 326 that are applicable to all data stored by the supplied user application. For example, administrators of the Gmail Application servers may establish blob policies 326 that are applicable to millions of user of Gmail.

In some implementations, communication between the client library 310 and the distributed storage system utilizes a load balancer 314, which can distribute user requests to various instances within the distributed storage system based on various conditions, such as network traffic and usage levels at each instance. In the implementation illustrated in FIG. 1C, the load balancer 314 is not an integrated component of the distributed storage system 200. The load balancer 314 communicates with both the client library 310 and the distributed storage system 200 over one or more networks 328. The network 328 may include the Internet, one or more local area networks (LANs), one or more wide are networks (WANs), one or more wireless networks (WiFi networks), or various combinations of these.

Figure 1D:
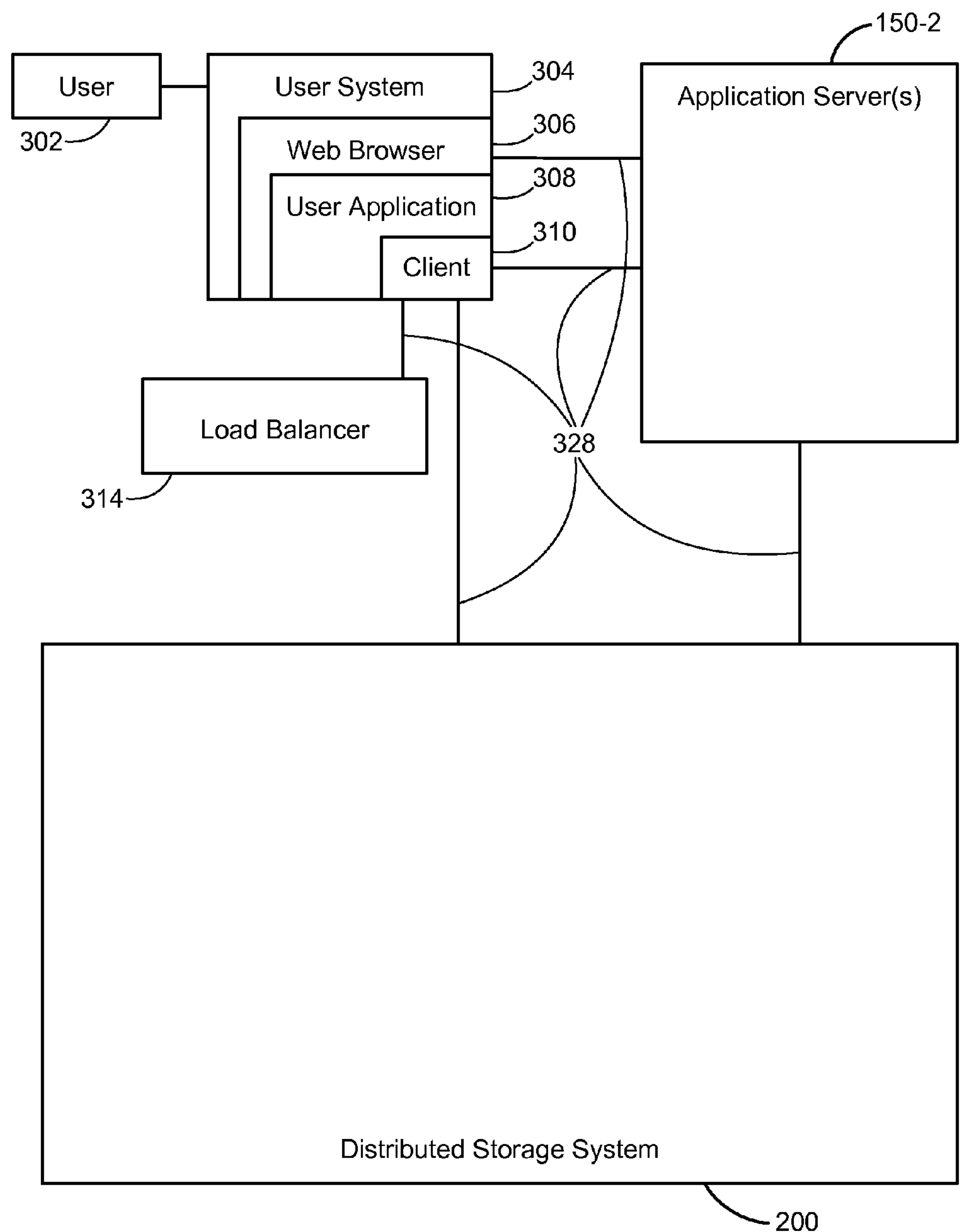

FIG. 1D illustrates an implementation that is similar to FIG. 1C, except that the load balancer 314 just returns information to the client library 310 to specify which instance 102 within the distributed storage system 200 should be contacted. The client library 310 then contacts the appropriate instance 102 directly.

Figure 1E:
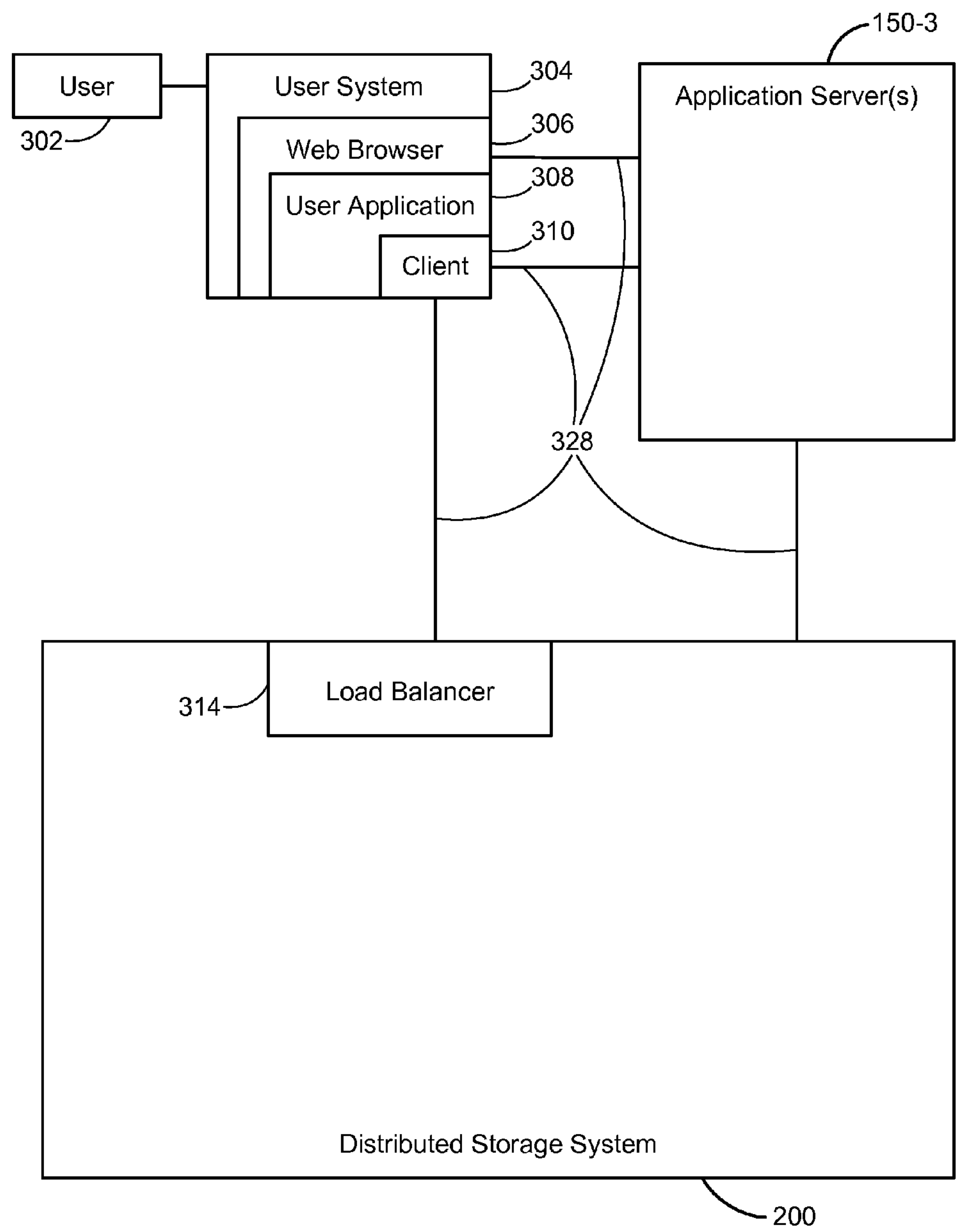

FIG. 1E illustrates an implementation that is similar to FIG. 1C, except that the load balancer 314 is an integrated part of the distributed storage system 200. In some implementations, load balancers 314 are included at some or all of the instances within the distributed storage system 200. Even in these implementations, a load balancer 314 may direct the communication to a different instance.

Figure 1F:
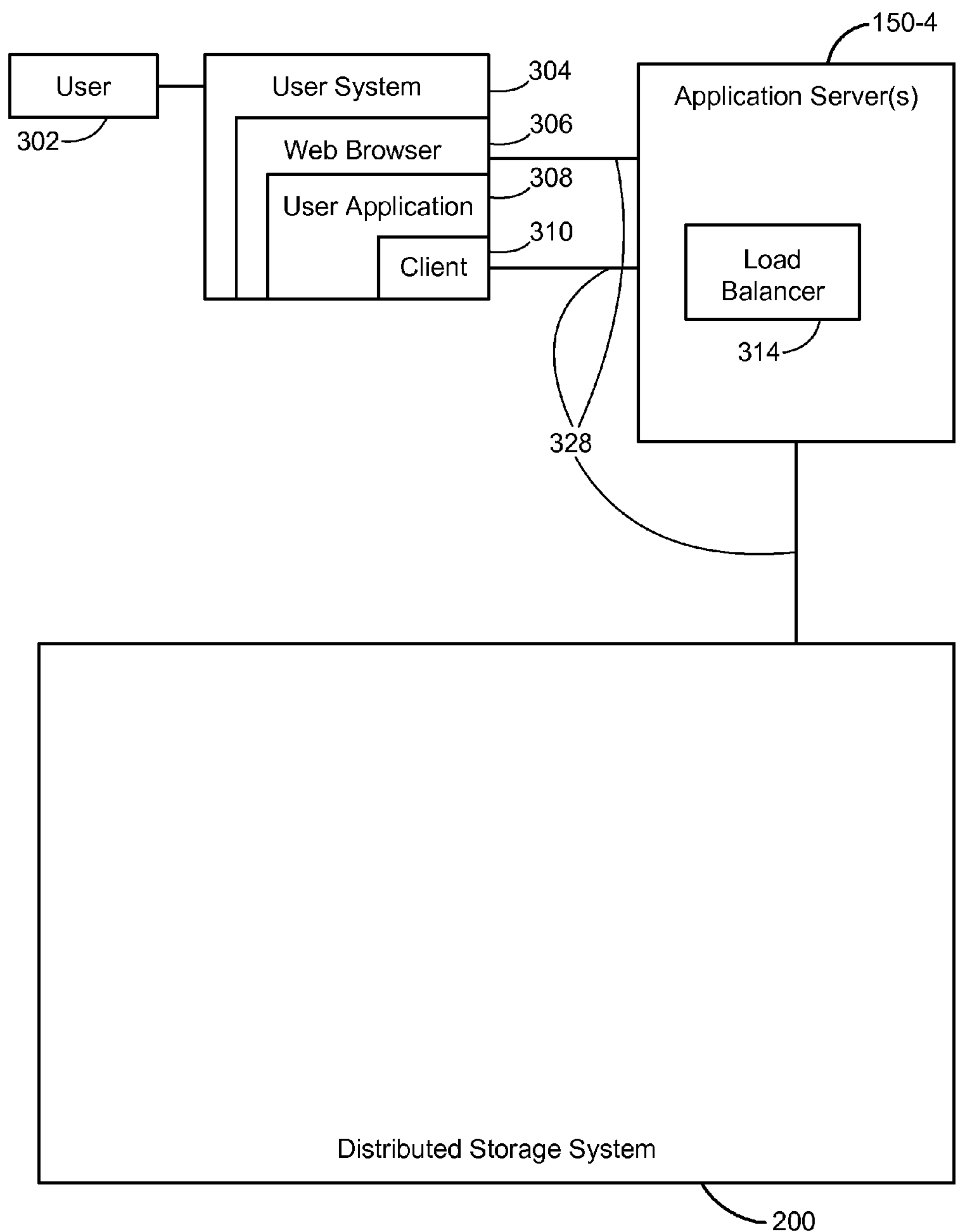

FIG. 1F illustrates an implementation that is similar to FIG. 1C, except that the load balancer 314 is included in the application servers 150-4. This implementation is more commonly used when the distributed storage system 200 is being used by a single user application provided by the application servers 150-4. In this case, the load balancer 314 has a complete picture of the load because the application servers 150-4 receive all of the traffic directed to the distributed storage system.

Figure 1G:
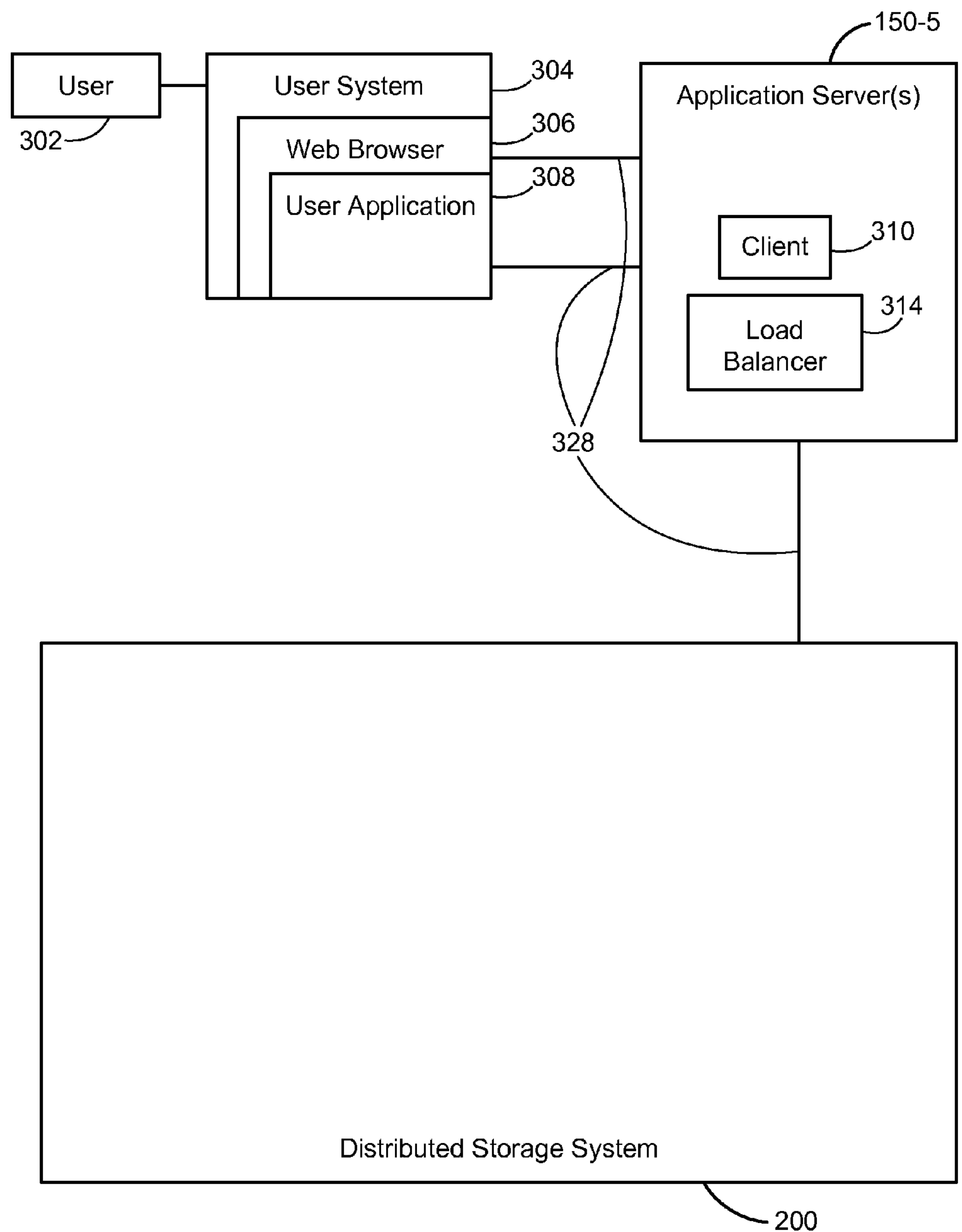

FIG. 1G illustrates a variation of FIG. 1F, in which the client library 310 is maintained at the application servers 150-5 rather than integrated within the running user application 308.

The distributed storage system 200 shown in FIGS. 2 and 3 includes certain global configuration information and applications 202, as well as a plurality of instances 102-1, . . . 102-N. In some implementations, the global configuration information includes a list of instances and information about each instance. In some implementations, the information for each instance includes: the set of storage nodes (data stores) at the instance; the state information, which in some implementations includes whether the metadata at the instance is global or local; and network addresses to reach the blobmaster 204 and bitpusher 210 at the instance. In some implementations, the global configuration information resides at a single physical location, and that information is retrieved as needed. In other implementations, copies of the global configuration information are stored at multiple locations. In some implementations, copies of the global configuration information are stored at some or all of the instances. In some implementations, the global configuration information can only be modified at a single location, and changes are transferred to other locations by one-way replication. In some implementations, there are certain global applications, such as the location assignment daemon 346 (see FIG. 3) that can only run at one location at any given time. In some implementations, the global applications run at a selected instance, but in other implementations, one or more of the global applications runs on a set of servers distinct from the instances. In some implementations, the location where a global application is running is specified as part of the global configuration information, and is subject to change over time.

FIGS. 2 and 3 illustrate an example set of programs, processes, and data that run or exist at each instance, as well as a user system that may access the distributed storage system 200 and some global applications and configuration. In some implementations, a user 302 interacts with a user system 304, which may be a computer or other device that can run a web browser 306. A user application 308 runs in the web browser, and uses functionality provided by client library 310 to access data stored in the distributed storage system 200 using network 328. Network 328 may be the Internet, a local area network (LAN), a wide area network (WAN), a wireless network (WiFi), a local intranet, or any combination of these. In some implementations, a load balancer 314 distributes the workload among the instances, so multiple requests issued by a single user system 304 need not all go to the same instance. In some implementations, the client library 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some implementations, user application 308 runs on the user system 304 without a web browser 306. Example user applications are an email application and an online video application.

In some implementations, each instance has a blobmaster 204, which is a program that acts as an external interface to the metadata store 206. For example, an external user application 308 can request metadata corresponding to a specified blob using client library 310. Note that a "blob" (i.e., a binary large object) is a collection of binary data (e.g., images, videos, binary files, executable code, etc.) stored as a single entity in a database. This specification uses the terms "blob" and "object" interchangeably and implementations that refer to a "blob" may also be applied to "objects," and vice versa. In general, the term "object" may refer to a "blob" or any other object such as a database object, a file, or the like, or a portion (or subset) of the aforementioned objects. In some implementations, every instance 102 has metadata in its metadata store 206 corresponding to every blob stored anywhere in the distributed storage system 200. In other implementations, the instances come in two varieties: those with global metadata (for every blob in the distributed storage system 200) and those with only local metadata (only for blobs that are stored at the instance). In particular, blobs typically reside at only a small subset of the instances. The metadata store 206 includes information relevant to each of the blobs, such as which instances have copies of a blob, who has access to a blob, and what type of data store is used at each instance to store a blob. The metadata store 206 is described in greater detail in co-pending U.S. patent application Ser. No. 12/703,167, "Method and System for Efficiently Replicating Data in Non-Relational Databases," filed Feb. 9, 2010, which is incorporated herein by reference in its entirety.

When a client library 310 wants to read a blob of data, the blobmaster 204 provides one or more read tokens to the client library 310, which the client library 310 provides to a bitpusher 210 in order to gain access to the relevant blob. When a client library 310 writes data, the client library 310 writes to a bitpusher 210. The bitpusher 210 returns write tokens indicating that data has been stored, which the client library 310 then provides to the blobmaster 204, in order to attach that data to a blob. A client library 310 communicates with a bitpusher 210 over network 328, which may be the same network used to communicate with the blobmaster 204. The communication between the client library 310 and bitpushers is also subject to load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blobs identifies which instances have copies of the desired blob, so the subsequent communication with a bitpusher 210 to read or write is at a different instance.

A bitpusher 210 copies data to and from data stores. In some implementations, the read and write operations comprise entire blobs. In other implementations, each blob comprises one or more chunks, and the read and write operations performed by a bitpusher are on solely on chunks. In some of these implementations, a bitpusher deals only with chunks, and has no knowledge of blobs. In some implementations, a bitpusher has no knowledge of the contents of the data that is read or written, and does not attempt to interpret the contents. Implementations of a bitpusher 210 support one or more types of data store. In some implementations, a bitpusher supports a plurality of data store types, including inline data stores 212, BigTable stores 214, file server stores 216, and tape stores 218. Some implementations support additional other stores 220, or are designed to accommodate other types of data stores as they become available or technologically feasible.

The inline stores 212 actually use storage space 208 in the metadata store 206. Inline stores provide faster access to the data, but have limited capacity, so inline stores are generally for relatively "small" blobs. In some implementations, inline stores are limited to blobs that are stored as a single chunk. In some implementations, "small" means blobs that are less than 32 kilobytes. In some implementations, "small" means blobs that are less than 1 megabyte. As storage technology facilitates greater storage capacity, even blobs that are currently considered large may be "relatively small" compared to other blobs.

The BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some implementations, the BigTable stores save data on a large array of BigTable database servers 316.

The file stores 216 store data on one or more file servers 318. In some implementations, the file servers use file systems provided by computer operating systems, such as UNIX. In other implementations, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other implementations, the file servers 318 implement NFS (Network File System) or other publicly available file systems not implemented by a computer operating system. In some implementations, the file system is distributed across many individual servers 318 to reduce risk of loss or unavailability of any individual computer.

The tape stores 218 store data on physical tapes 320. Unlike a tape backup, the tapes here are another form of storage. The tape stores 218 are described in greater detail in co-pending U.S. patent application Ser. No. 13/023,498 "Method and System for Providing Efficient Access to a Tape Storage System," filed Feb. 8, 2011, which is incorporated herein by reference in its entirety. In some implementations, a Tape Master application 222 assists in reading and writing from tape. In some implementations, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some implementations, a large read/write buffer is used to manage reading and writing data to tape. In some implementations, this buffer is managed by the tape master application 222. In some implementations there are separate read buffers and write buffers. In some implementations, a client library 310 cannot directly read or write to a copy of data that is stored on tape. In these implementations, a client must read a copy of the data from an alternative data source, even if the data must be transmitted over a greater distance.

In some implementations, there are additional other stores 220 that store data in other formats or using other devices or technology. In some implementations, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some implementations, data is automatically stored in specific data store types based on matching the characteristics of the data to the characteristics of the data stores. In some implementations, users 302 who create files may specify the type of data store to use. In other implementations, the type of data store to use is determined by the user application 308 that creates the blobs of data. In some implementations, a combination of the above selection criteria is used. In some implementations, each blob is assigned to a blob policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some implementations, blob policies 326 are stored as part of the global configuration information and applications 202.

In some implementations, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution. Even if the quorum clock server 228 determines that the independent clocks are consistent with each other (or with a subset of each other), the independent clocks may still be unreliable. For example, it is possible the independent clocks are skewed in the same direction (e.g., skewed to the future or past). Thus, calculating time intervals using times reported by the quorum clock server 228 may still produce incorrect behavior. The implementations described below may be used to determine time intervals between two times reported by an unreliable clock (e.g., the clock generated by the quorum clock server 228). Techniques for determining time intervals between two times reported by an unreliable clock are described in greater detail in co-pending U.S. Provisional Patent Application Ser. No. 61/302,894, "System and Method for Determining the Age of Objects in the Presence of Unreliable Clocks," filed Feb. 9, 2010, which is incorporated herein by reference in its entirety.

In some implementations, each instance has a replication module 224, which identifies blobs or chunks that will be replicated to other instances. In some implementations, the replication module 224 may use one or more replication queues 226-1, 226-2, etc. Items to be replicated are placed in a replication queue 226, and the items are replicated when resources are available. In some implementations, items in a replication queue 226 have assigned priorities, and the highest priority items are replicated as bandwidth becomes available. There are multiple ways that items can be added to a replication queue 226. In some implementations, items are added to replication queues 226 when blob or chunk data is created or modified. For example, if an end user 302 modifies a blob at instance 1, then the modification needs to be transmitted to all other instances that have copies of the blob. In implementations that have priorities in the replication queues 226, replication items based on blob content changes have a relatively high priority. In some implementations, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. patent application Ser. No. 13/022,579, "Method and System for Dynamically Replicating Data within a Distributed Storage System," filed Feb. 7, 2011, incorporated herein by reference in its entirety.

In some implementations, a background replication process creates and deletes copies of blobs based on blob policies 326 and blob access data provided by a statistics server 324. The blob policies specify how many copies of a blob are desired, where the copies should reside, and in what types of data stores the data should be saved. In some implementations, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226. In some implementations, the location assignment daemon 322 manages replicas of objects globally for the distributed storage system 200. In other words, there is only one location assignment daemon 322 in the distributed storage system 200. The use of blob policies 326 and the operation of a location assignment daemon 322 are described in more detail below. The replication queues 226 are described in more detail in co-pending U.S. patent application Ser. No. 13/022,564, "System and Method for Replicating Objects in a Distributed Storage System," filed Feb. 7, 2011, which is incorporated herein by reference in its entirety.

Figure 4:
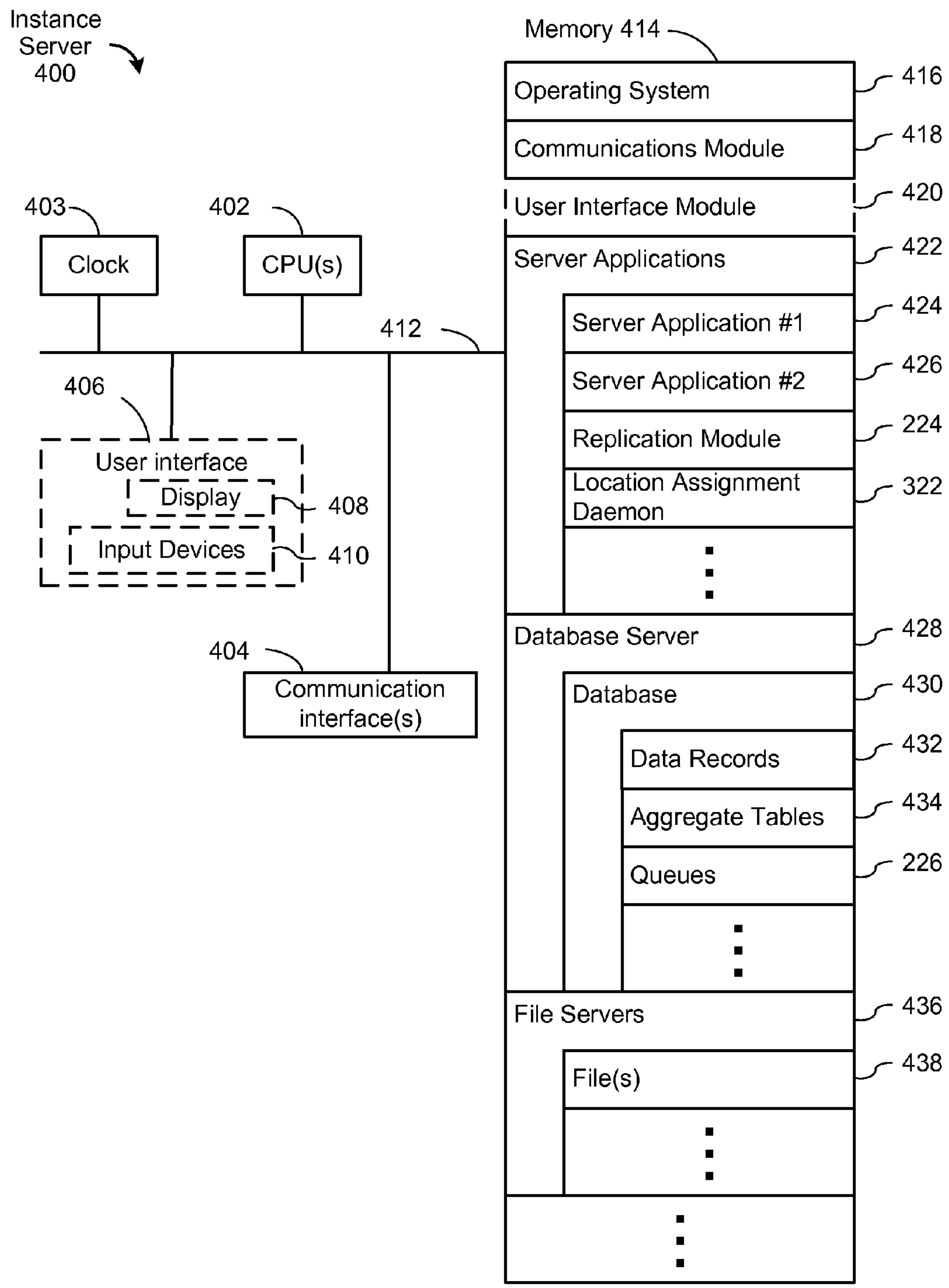
FIG. 4 is a block diagram of an instance server that may be used for the various programs and processes, according to some implementations.

FIG. 4 is a block diagram illustrating an Instance Server 400 used for operations identified in FIGS. 2 and 3 in accordance with some implementations of the present invention. An Instance Server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some implementations, the clock 403 is a local clock that is periodically synchronized with a clock server (e.g., a quorum clock server 228 or any other clock server on a network, etc.). In some implementations, an Instance Server 400 includes a user interface 406 comprising a display device 408 and one or more input devices 410. In some implementations, memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other non-volatile solid state storage devices. In some implementations, memory 414 includes one or more storage devices remotely located from the CPU(s) 402. Memory 414, or alternately the non-volatile memory device(s) within memory 414, comprises a computer readable storage medium. In some implementations, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- an optional user interface module 420 that receives commands from the user via the input devices 410 and generates user interface objects in the display device 408;
- one or more server applications 422, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 424 and 426 may execute on the same physical computer; and
- one or more database servers 428 that provides storage and access to one or more databases 430. The databases 430 may provide storage for metadata store 206, replication queues 226, blob policies 326, global configuration store 312, the statistics used by statistics server 324, as well as ancillary databases used by any of the other functionality. Each database 430 has one or more tables with data records 432. In some implementations, some databases include aggregate tables 434, such as the statistics used by statistics server 324;
- one or more file servers 436 that provide access to read and write files, such as files 438. File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the implementations described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods. Furthermore, for implementations in which the location assignment daemon 322 manages replicas of objects globally for the distributed storage system 200, the location assignment daemon 322 is located on a computer system that is separate and distinct from the instance servers. The components of the computer system that includes the location assignment daemon 322 are similar to the instance server 400 with the exception that computer system may omit the server applications 424 and 426, the replication module 224, the database server 428, the file servers 436, and any combination thereof. In some implementations, each instance of the distributed storage system 200 includes a stripped-down version of the location assignment daemon 322. The stripped-down version of the location assignment daemon 322 is used by a particular instance of the distributed storage system 200 when a new object is created. These implementations are described in more detail below.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides example information about a typical number of instance servers 400 that are assigned to each of the functions. In some implementations, each instance has about 10 instance servers performing (502) as blobmasters. In some implementations, each instance has about 100 instance servers performing (504) as bitpushers. In some implementations, each instance has about 50 instance servers performing (506) as BigTable servers. In some implementations, each instance has about 1000 instance servers performing (508) as file system servers. File system servers store data for file system stores 216 as well as the underlying storage medium for BigTable stores 214. In some implementations, each instance has about 10 instance servers performing (510) as tape servers. In some implementations, each instance has about 5 instance servers performing (512) as tape masters. In some implementations, each instance has about 10 instance servers performing (514) replication management, which includes both dynamic and background replication. In some implementations, each instance has about 5 instance servers performing (516) as quorum clock servers.

Life of an Object

Figure 6A:
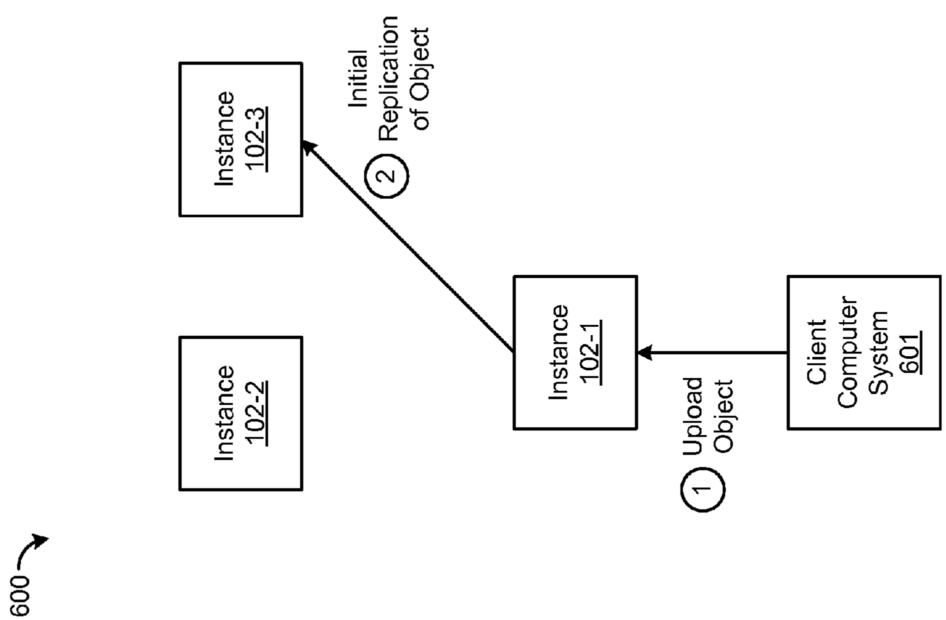
FIG. 6A is a block diagram illustrating the creation and the initial replication of an object, according to some implementations.
Figure 6B:
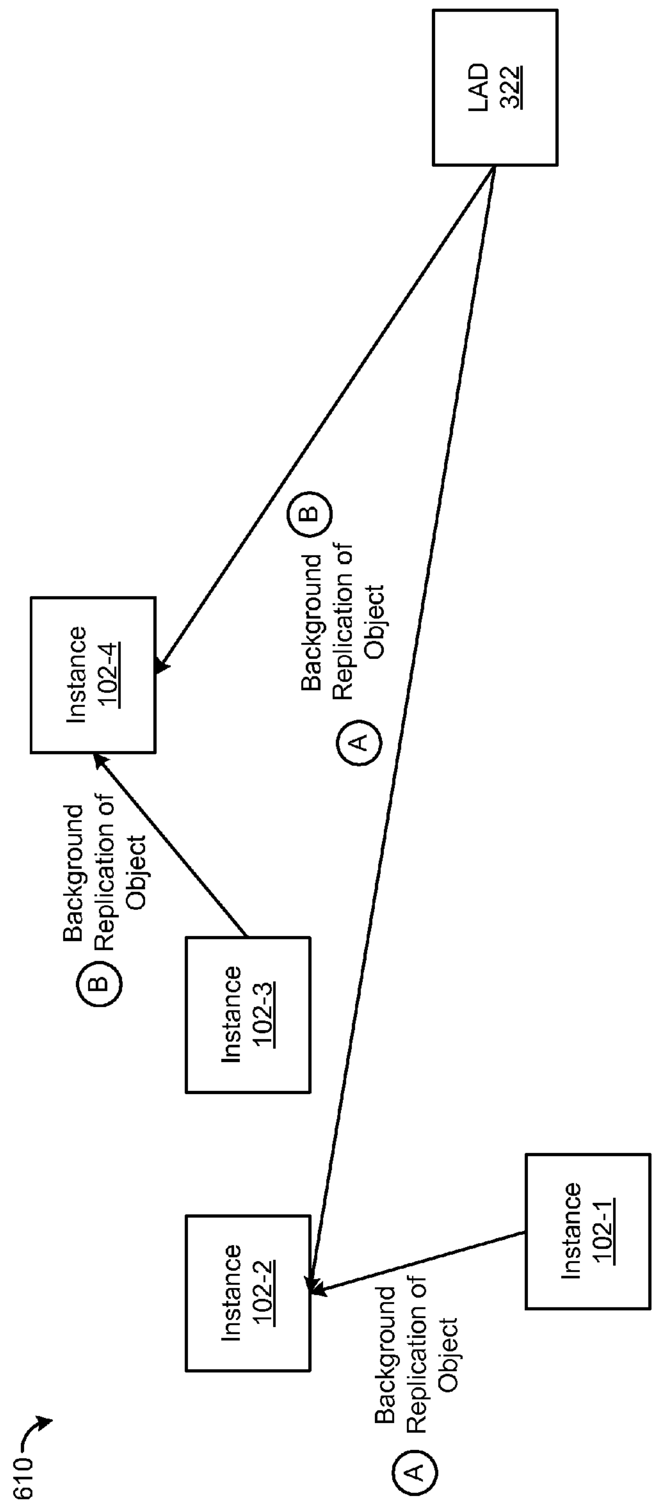
FIG. 6B is a block diagram illustrating the background replication of the object, according to some implementations.

FIGS. 6A-6D present block diagrams 600, 610, 620, and 630 illustrating an example sequence of events in the life of an example object in the distributed storage system 200, according to some implementations. In FIG. 6A, a client computer system 601 uploads (1) an object to instance 102-1 of the distributed storage system 200. In order to ensure data integrity, an initial replication of the object (2) is performed. In this example, a replica of the object is created in instance 102-3 of the distributed storage system 200.

Some time later, the location assignment daemon 322 initiates background replication (A, B) of the object based on replication policies for the object. The location assignment daemon 322 generates a replication request based on the policies for the object. The replication policies specify, among other things, a minimum and/or a maximum number of replicas of the object to be maintained in the distributed storage system 200. The replication request for the object includes a priority that is used when inserting the replication request into a replication queue 226 (i.e., a priority queue). In this example, replicas of the object are stored in instances 102-2 and 102-4 of the distributed storage system.

Figure 6C:
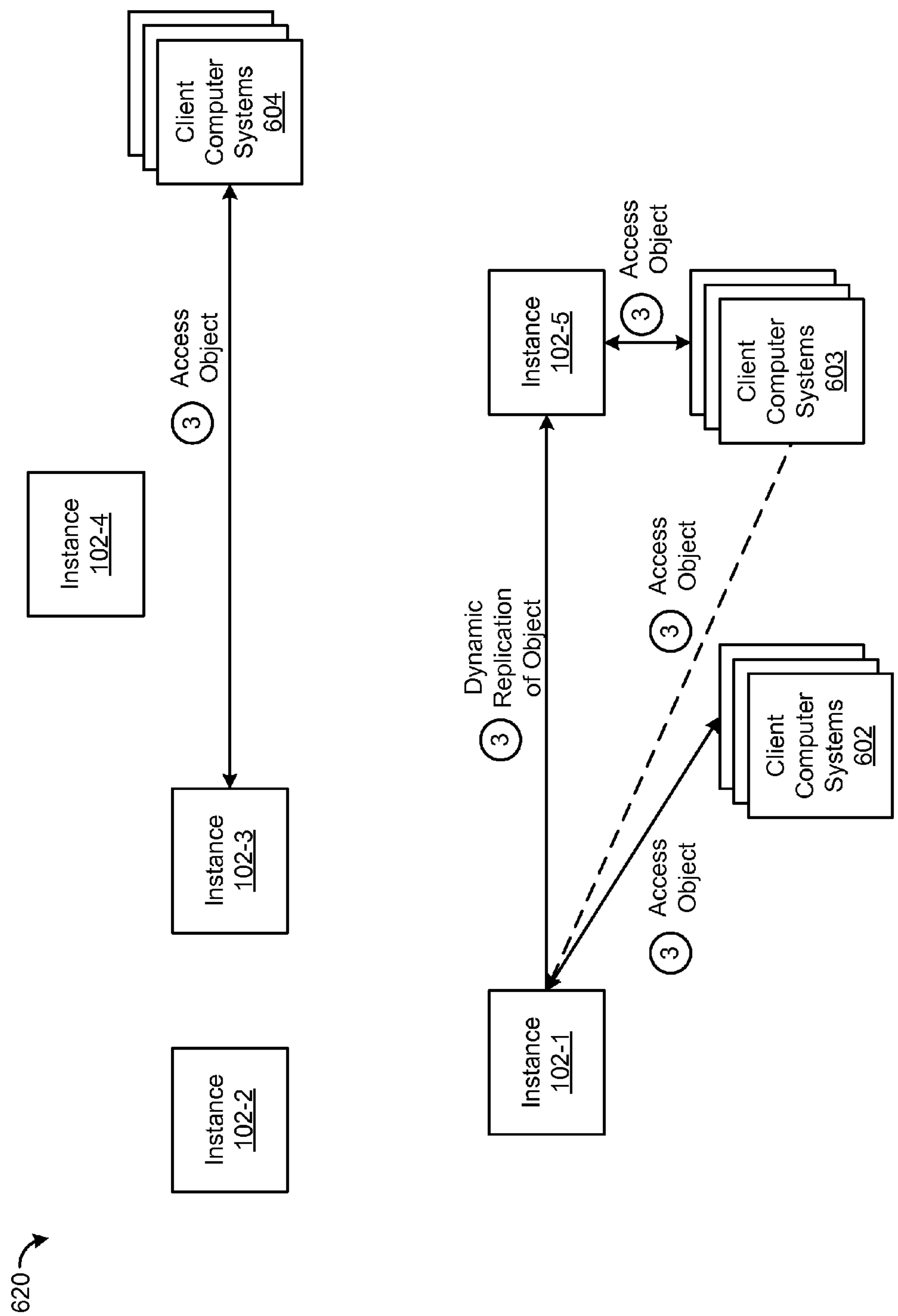
FIG. 6C is a block diagram illustrating a dynamic replication of the object, according to some implementations.

At some point in time (either before or after the events illustrated in FIG. 6B), the object experiences a large demand. For example, client computer systems 602, 603, and 604 may request (3) access to the object. If the demand for the object exceeds the current capacity of a particular instance of the distributed storage system, a dynamic replication of the object (3) is performed in which a replica of the object is created in one or more instances. In this example, a replica of the object is created in instance 102-5 of the distributed storage system. A subset of the requests for the object are then redirected to the instance 102-5 as illustrated in FIG. 6C. Note that a dynamic replication of the object may also be performed to reduce the network latency between the client computer systems attempting to access the object and the instance at which the object is located. For example, if the replicas of the object are initially located in instances of the distributed storage system 200 within the United States, but there is a large demand for the object from Japan, replicas of the object may be created in instances of the distributed storage system 200 that located are within Japan.

Figure 6D:
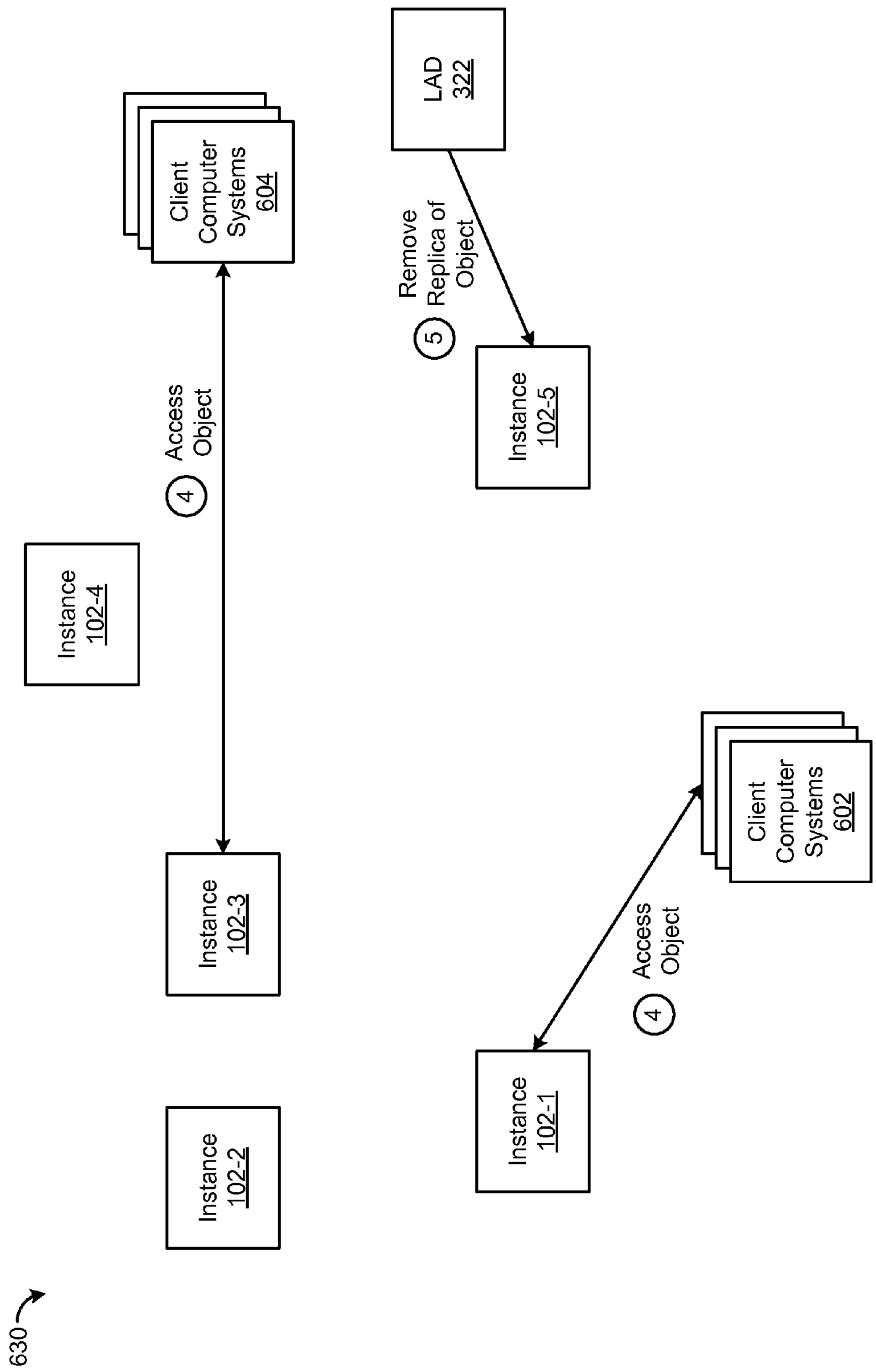
FIG. 6D is a block diagram illustrating the removal of a replica of the object, according to some implementations.

Dynamic replication requests may increase the number of replicas of the object beyond a number allowed by the replication policies for the object. When the demand of an object decreases (e.g., only client computer systems 602 and 604 are still requesting the object), replicas of the object that exceed the replication policies for the object may be removed. In these cases, the location assignment daemon 322 removes (5) the extra replicas of the object when it has been determined that the extra replicas of the object are no longer needed (e.g., demand for the object has decreased), as illustrated in FIG. 6D.

Storing Metadata for a File in a Distributed Storage System

As discussed above, after a file is uploaded to at least one storage cluster in the distributed storage system, the file may appear to be unaccessible if a request for the file is directed to an instance of the distributed storage system that does not have the metadata for the file (e.g., the location of the file in the distributed storage system). The implementations discussed below with reference to FIGS. 7-15 address this problem.

Figure 7:
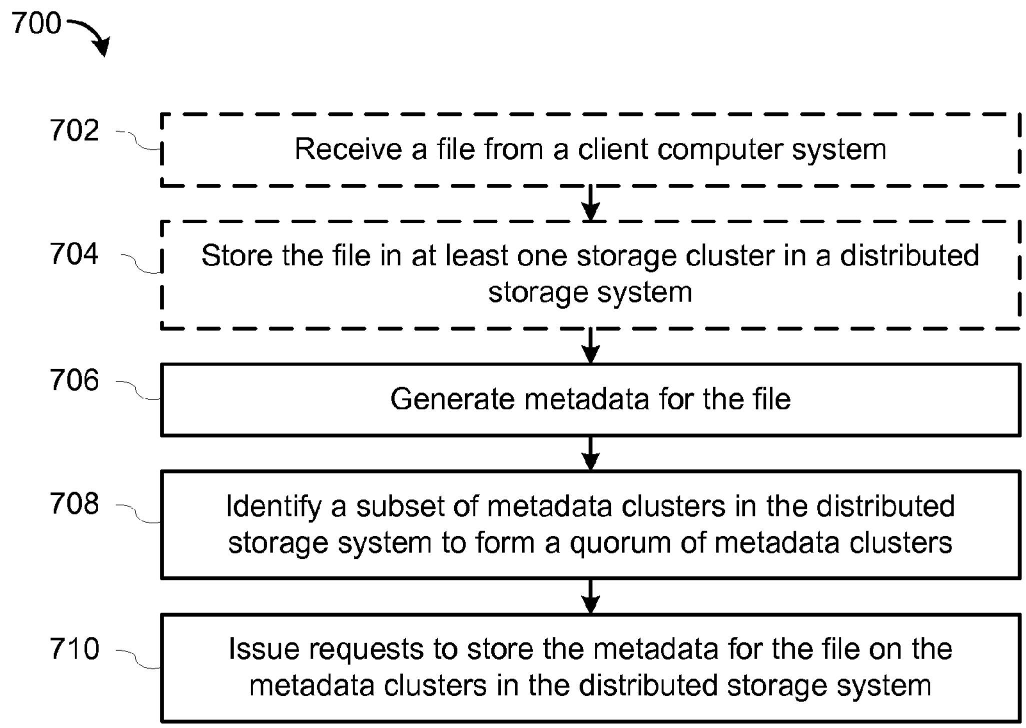
FIG. 7 is a flowchart of a method for storing metadata for a file in a distributed storage system, according to some implementations.

FIG. 7 is a flowchart of a method 700 for storing metadata for a file (or any other object) in a distributed storage system (e.g., the distributed storage system comprising the instances 102), according to some implementations. In some implementations, the bitpusher 210 optionally receives (702) a file from a client computer system (e.g., the user system 304) and optionally stores (704) the file in the at least one storage cluster in the distributed storage system (e.g., at least one of the instances 102). In some implementations, the file is stored asynchronously on the at least one storage cluster. Operation 704 is described in more detail below with reference to FIG. 15 below.

Operations 706-710 may be performed either on a newly-uploaded file (e.g., as discussed above with reference to optional operations 702 and 704) or for an existing file in the distributed storage system whose metadata has not been replicated (propagated) to the other instances of the distributed storage system.

The blobmaster 204 generates (706) metadata for the file. In some implementations, the metadata for the file includes information identifying at least one location of the file in at least one storage cluster in the distributed storage system. The metadata may include object information (e.g., a creation time, a content hash value, etc.), policies (e.g. placement policy, security policy, etc.), and user information (e.g., attachment MIME type, etc.).

The blobmaster 204 identifies (708) a subset of metadata clusters in the distributed storage system to form a quorum of metadata clusters. Operation 708 is described in more detail below with reference to FIGS. 9, 12, and 14 below.

The blobmaster 204 then issues (710) requests to store the metadata for the file on the metadata clusters in the distributed storage system, where the requests include high priority requests to store the metadata for the file on at least one of the metadata clusters in the quorum of metadata clusters and normal priority requests to store the metadata in the remaining metadata clusters, and where the metadata is stored on the at least one of the metadata clusters in the quorum of metadata clusters before being stored on the remaining metadata clusters. Since the metadata for the file is available in at least one of the metadata cluster in the quorum of metadata clusters, when the blobmaster 204 (e.g., for a particular instance of the distributed storage system) receives a request to obtain the file, the blobmaster 204 obtains the metadata for the file from the quorum of metadata clusters and identifies the location of the file in the distributed storage system based on the metadata. The process of servicing a request to obtain the file is described in more detail below with reference to FIG. 8.

In some implementations, the blobmaster 204 issues high priority requests to store the metadata for the file to a majority of the quorum of metadata clusters. For example, if the quorum of metadata clusters includes three metadata clusters, the blobmaster 204 issues high priority requests to store the metadata for the file to at least two of the metadata clusters in the quorum of metadata clusters.

Figure 8:
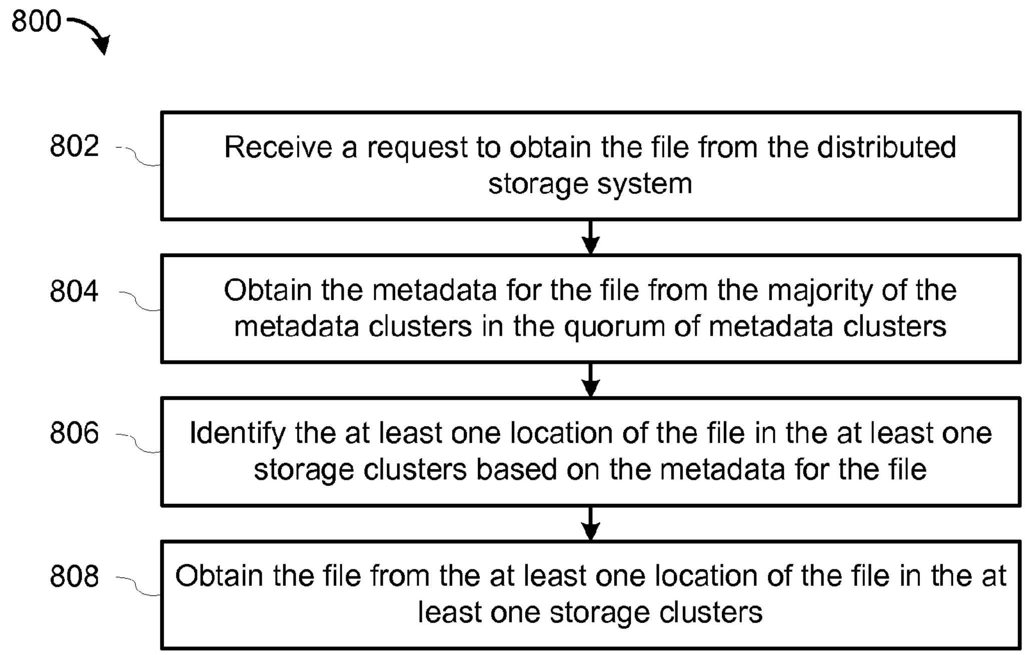
FIG. 8 is a flowchart of a method for obtaining a file in a distributed storage system, according to some implementations.

After the metadata for the file is stored on the at least one of the metadata clusters in the quorum of metadata clusters, the file may be obtained from the distributed storage system using the metadata for the file. FIG. 8 is a flowchart of a method 800 for obtaining the file in the distributed storage system, according to some implementations. The blobmaster 204 receives (802) a request to obtain the file from the distributed storage system. For example, the request may be a URL that includes an object identifier for the file.

In response to the request, the blobmaster 204 obtains (804) the metadata for the file from the at least one of the metadata clusters in the quorum of metadata clusters. In some implementations, the blobmaster 204 uses the object identifier for the file to identify the quorum of metadata clusters that include the metadata for the file. For example, the blobmaster 204 may use the process described below with reference to FIGS. 9-11 to identify the quorum of metadata clusters that include the metadata for the file.

The blobmaster 204 then identifies (806) the at least one location of the file in the at least one storage clusters based on the metadata for the file.

The bitpusher 210 obtains (808) the file from the at least one location of the file in the at least one storage clusters. In some implementations, instead of the bitpusher 210 performing operation 808, the blobmaster 204 provides the at least one location of the file in the at least one storage cluster to a sender of the request (e.g., a client computer system). In these implementations, the client computer system then obtains the file from the at least one location of the file in the at least one storage clusters. For example, the client computer system may send at least one request to the at least one storage clusters to obtain the file.

Figure 9:
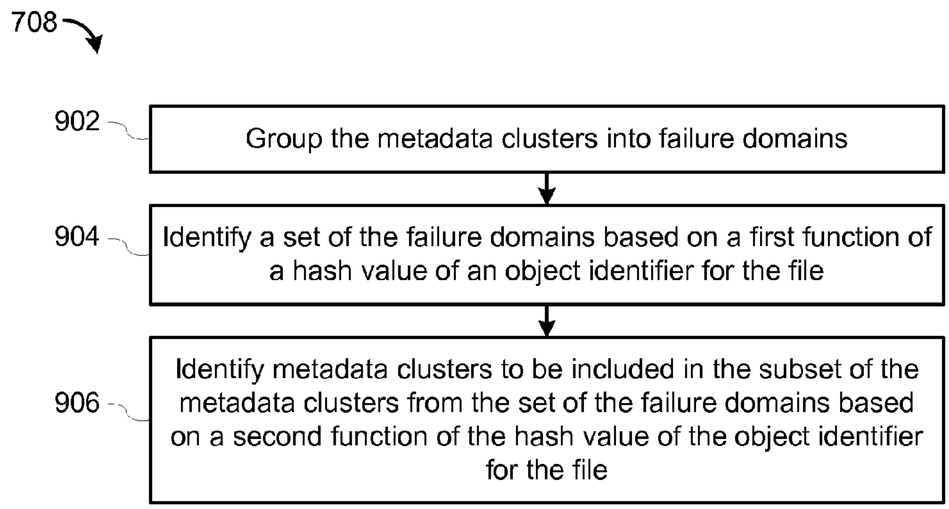
FIG. 9 is a flowchart of a method for identifying a subset of metadata clusters in a distributed storage system to form a quorum of metadata clusters, according to some implementations.
Figure 12:
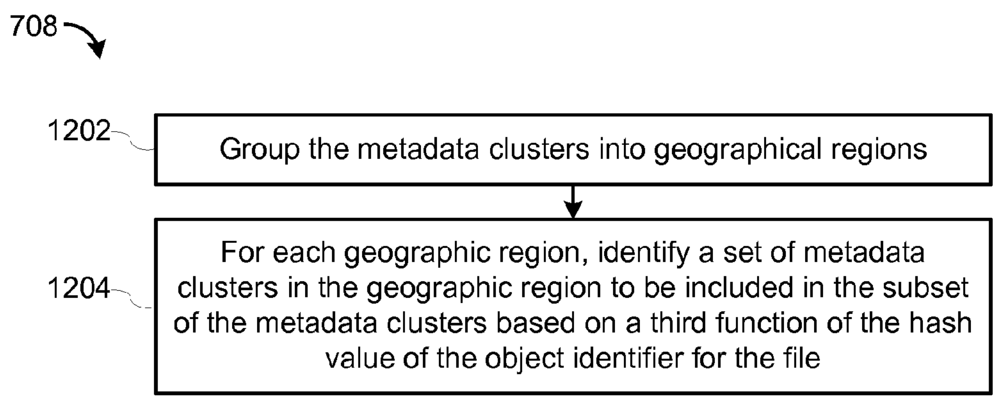
FIG. 12 is a flowchart of a method for identifying a subset of metadata clusters in a distributed storage system to form a quorum of metadata clusters, according to some implementations.
Figure 14:
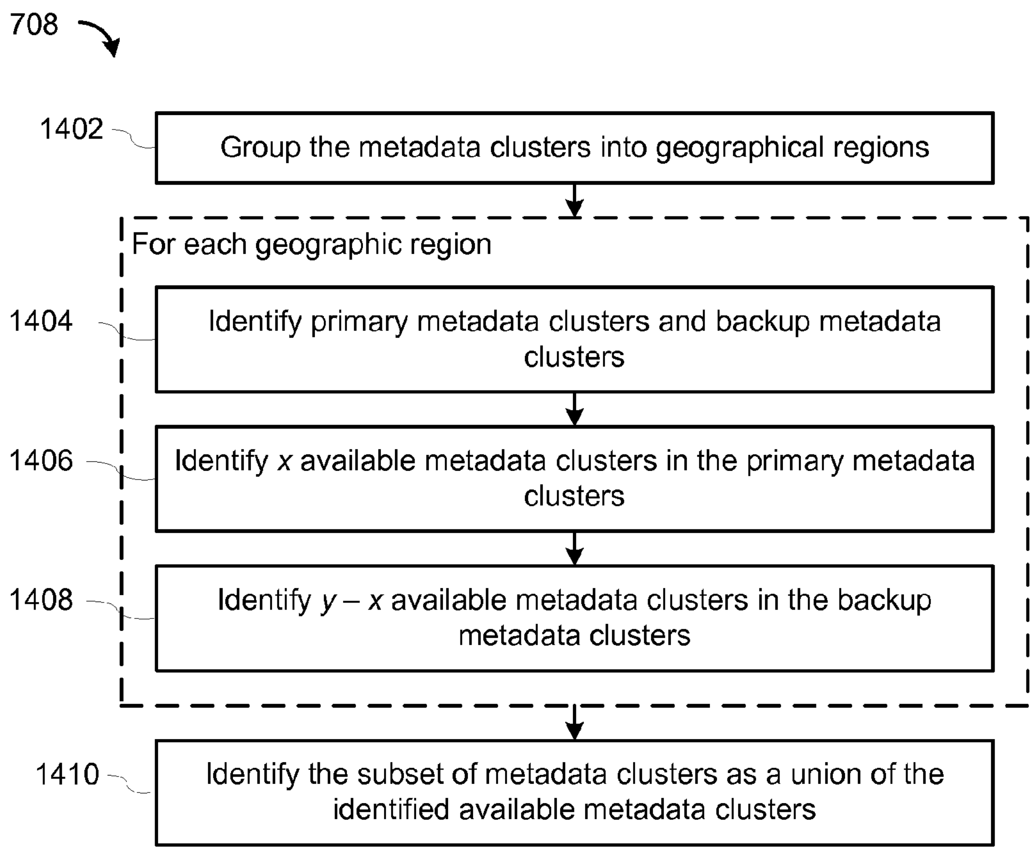
FIG. 14 is a flowchart of a method for identifying a subset of metadata clusters in a distributed storage system to form a quorum of metadata clusters, according to some implementations.

FIGS. 9, 12, and 14 illustrate three example processes for identifying (708) a subset of metadata clusters in a distributed storage system to form a quorum of metadata clusters, according to some implementations.

In FIG. 9, the blobmaster 204 groups (902) the metadata clusters into failure domains. A respective failure domain includes metadata clusters that are likely to be concurrently unavailable. For example, a failure domain may include metadata clusters that may be taken down for maintenance at the same time. In some implementations, the blobmaster 204 maintain a global quorum configuration that includes a set of metadata clusters sorted in a predetermined order (e.g., alphanumeric order based on identifiers of the metadata clusters, etc.) and/or a predetermined grouping (e.g., a grouping by failure domains, a grouping by regions, etc.). In this case, the blobmaster 204 stores the groupings of metadata clusters by failure domains in the global quorum configuration. The global quorum configuration may then be used when obtaining metadata for files (e.g., operation 804 in FIG. 8). Furthermore, once the global quorum configuration has been determined (e.g., operation 902 has been previously performed), operation 902 may be omitted in subsequent operations in which the blobmaster 204 identifies (708) the subset of metadata clusters.

Figure 10:
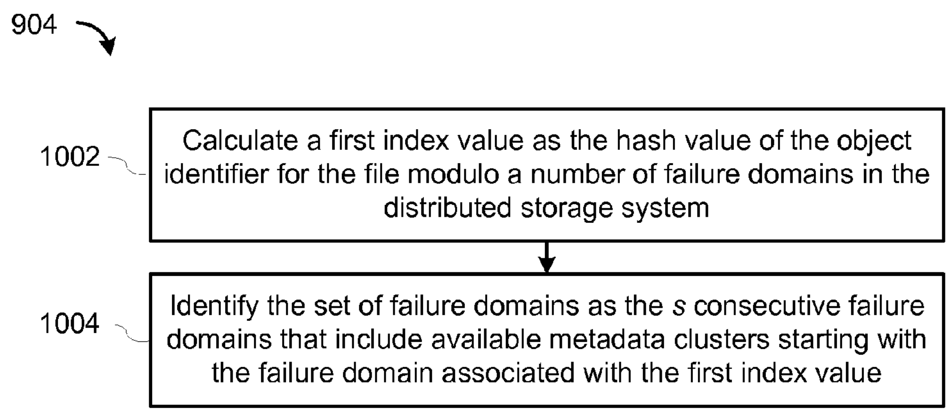
FIG. 10 is a flowchart of a method for identifying a set of failure domains, according to some implementations.

The blobmaster 204 then identifies (904) a set of the failure domains based on a first function of a hash value of an object identifier for the file, wherein the set of failure domains includes metadata clusters that are available. Attention is now directed to FIG. 10, which is a flowchart of a method for identifying (904) a set of failure domains, according to some implementations. The blobmaster 204 calculates (1002) a first index value as the hash value of the object identifier for the file modulo a number of failure domains in the distributed storage system. For example, assuming that the number of failure domains in the distributed storage system is 6, the blobmaster 204 calculates the first index value as hash(objectID) % 6, where objectID is the object identifier for the file, hash( ) is a hash function (e.g., MD5, SHA1, etc.), hash (objectID) is the hash value, and "%" is the modulo function. For this example, assume that hash(objectID) % 6=1.

The blobmaster 204 then identifies (1004) the set of failure domains as the s consecutive failure domains that include available metadata clusters starting with the failure domain associated with the first index value, where s is a desired number of metadata clusters in the quorum of metadata clusters. Note that each failure domain is associated with a respective index value. The index values for the failure domains may be assigned to the failure domains by first sorting the failure domains (e.g., in alphabetic order, in numerical order, etc.) and then assigning the index values to the failure domains in the sorted order. Continuing the example from above, assuming that s=3, the blobmaster 204 identifies the set of failure domains as the 3 consecutive failure domains that include available metadata clusters starting with the index 1. The blobmaster 204 may identify the set of failure domains as failure domains 1, 2, and 3 (i.e., the failure domains having index values of 1, 2, and 3, respectively) if failure domains 1, 2, and 3 include available metadata clusters. However, if failure domain 2 does not include available metadata clusters, but failure domains 1, 3, and 4 include available metadata clusters, the blobmaster 204 identifies the set of failure domains as failure domains 1, 3, and 4. Note that if the first index value were 5 (i.e., the last failure domain in the sort order of failure domains for this example), the blobmaster 204 may identify the set of failure domains as failure domains 5, 0, and 1. In other words, the blobmaster 204 identifies 3 consecutive failure domains in cyclic order. In some implementations, the consecutive failure domains include consecutive failure domains that have ascending index values (e.g., clockwise). In some implementations, the consecutive failure domains include consecutive failure domains that have descending index values (e.g., counter clockwise).

Figure 11:
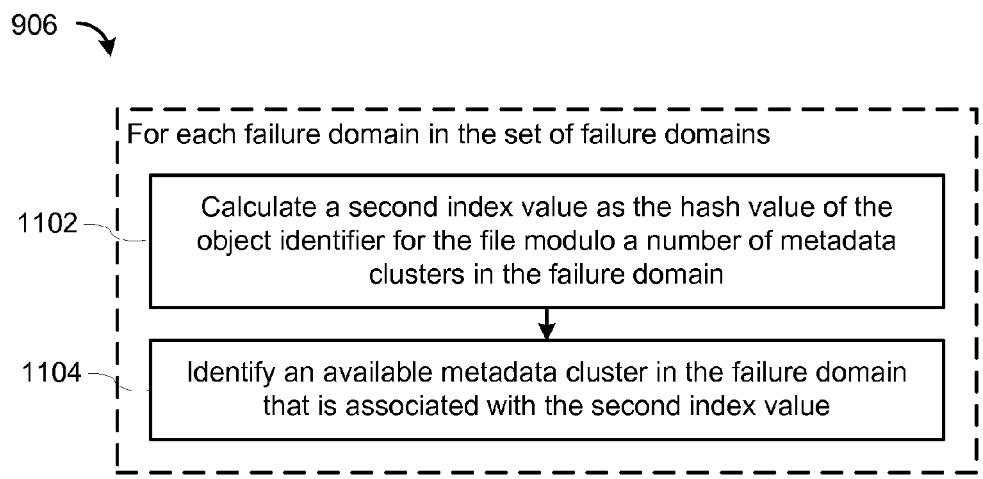
FIG. 11 is a flowchart of a method for identifying metadata clusters to be included in a subset of metadata clusters from the set of the failure domains, according to some implementations.

Returning to FIG. 9, the blobmaster 204 then identifies (906) metadata clusters to be included in the subset of the metadata clusters from the set of the failure domains based on a second function of the hash value of the object identifier for the file. Attention is now directed to FIG. 11, which is a flowchart of a method for identifying (906) metadata clusters to be included in a subset of metadata clusters from the set of the failure domains, according to some implementations. For each failure domain in the set of failure domains, the blobmaster 204 calculates (1102) a second index value as the hash value of the object identifier for the file modulo a number of metadata clusters in the failure domain and identifies (1104) an available metadata cluster in the failure domain that is associated with the second index value, where the available metadata cluster is included in the subset of the metadata clusters. For example, assuming that a particular failure domain in the set of failure domains includes 3 metadata clusters, the blobmaster 204 calculates the second index value as hash(objectID) % 3. For this example, assume that hash (objectID) % 3=2. Thus, the blobmaster 204 identifies the metadata cluster 2 (i.e., the metadata cluster having an index value of 2) in the failure domain if metadata cluster 2 is available. However, if metadata cluster is not available, but metadata cluster 0 is available, the blobmaster 204 identifies the metadata cluster 0.

Note that each failure domain may include an arbitrary number of metadata clusters. In some implementations, the number of metadata clusters in the failure domain only includes the available metadata clusters in the failure domain. For example, if a particular failure domain includes 5 metadata clusters, but only 2 of the metadata clusters are available, the number of metadata cluster in the failure domain is 2 and only the 2 metadata clusters that are available are associated with index values. Thus, the blobmaster 204 calculates the second index value as hash(objectID) % 2.

In FIG. 12, the blobmaster 204 groups (1202) the metadata clusters into geographical regions. For example, the blobmaster 204 may group the metadata clusters into 3 regions: United States (US), Europe (EU), and Asia (AS). As discussed above, the blobmaster 204 may maintain a global quorum configuration. In this case, the blobmaster 204 stores the groupings of metadata clusters by geographical regions in the global quorum configuration. Once the global quorum configuration has been determined (e.g., operation 1202 has been previously performed), operation 1202 may be omitted in subsequent operations in which the blobmaster 204 identifies (708) the subset of metadata clusters.

Figure 13:
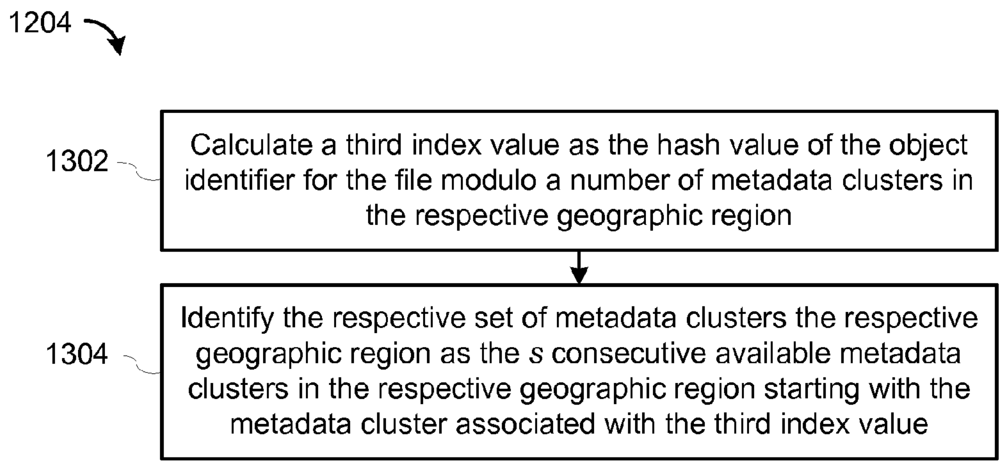
FIG. 13 is a flowchart of a method for identifying a respective set of metadata clusters in a respective geographic region to be included in the subset of the metadata clusters, according to some implementations.

For each geographic region, the blobmaster 204 then identifies (1204) a set of metadata clusters in the geographic region to be included in the subset of the metadata clusters based on a third function of the hash value of the object identifier for the file. Attention is now directed to FIG. 13, which is a flowchart of a method for identifying (1204) a respective set of metadata clusters in a respective geographic region to be included in the subset of the metadata clusters, according to some implementations. The blobmaster 204 calculates (1302) a third index value as the hash value of the object identifier for the file modulo a number of metadata clusters in the respective geographic region. For example, if the number of metadata clusters in the US region is 10, the number of metadata clusters in the EU region is 5, and the number of metadata clusters in the AS region is 4, the blobmaster 204 calculates the third index value as hash(objectID) % 10 for the US region, hash(objectID) % 5 for the EU region, and hash(objectID) % 4 for the AS region. For this example, assume that the third index value for the US region is 6, the third index value for the EU region is 2, and the third index value for the AS region is 3. In some implementations, the number of metadata clusters in a particular geographic region only includes the available metadata clusters in the particular geographic region.

The blobmaster 204 then identifies (1304) the respective set of metadata clusters the respective geographic region as the s consecutive available metadata clusters in the respective geographic region starting with the metadata cluster associated with the third index value, where s is a desired number of metadata clusters in the quorum of metadata clusters for the respective geographic region. Note that each metadata cluster in the respective geographic region is associated with a respective index value. The index values for the failure domains may be assigned to the metadata clusters in the respective geographic region by first sorting the metadata clusters in the geographic region (e.g., in alphabetic order, in numerical order, etc.) and then assigning the index values to the metadata clusters in the sorted order. Continuing the example from above, assuming that s=3 for the US region, s=2 in the EU region, and s=1 in the AS region, the blobmaster 204 identifies the set of failure domains as the 3 consecutive available metadata clusters starting with the index 6 in the US region (e.g., metadata clusters 6, 7, and 8 in the US region), the 2 consecutive available metadata clusters starting with the index 2 in the EU region (e.g., metadata clusters 2 and 3 in the EU region), and the 1 available metadata clusters starting with the index 3 in the AS region (e.g., metadata clusters 1 in the AS region). Again, the blobmaster 204 identifies the consecutive available metadata cluster in cyclic order (either ascending/clockwise or descending/counterclockwise order), skipping the unavailable metadata clusters.

In some implementations, the metadata clusters in a respective set of metadata clusters in a respective region are in different failure domains.

In FIG. 14, the blobmaster 204 groups (1402) the metadata clusters into geographical regions. For example, the regions may include the US region and the EU region. As discussed above, the blobmaster 204 may maintain a global quorum configuration. In this case, the blobmaster 204 stores the groupings of metadata clusters by geographical regions in the global quorum configuration. Once the global quorum configuration has been determined (e.g., operation 1202 has been previously performed), operation 1402 may be omitted in subsequent operations in which the blobmaster 204 identifies (708) the subset of metadata clusters.

For each geographic region, the blobmaster 204 identifies (1404) primary metadata clusters and backup metadata clusters, identifies (1406) x available metadata clusters in the primary metadata clusters, where x is less than or equal to a desired number, y, of metadata servers in the quorum of metadata servers for the geographic region, and identifies (1408) y−x available metadata clusters in the backup metadata clusters. The primary metadata clusters include metadata clusters from different failure domains and the backup metadata clusters include metadata clusters from different failure domains. For example, x=2 and y=3 for the US region and x=1 and y=2 for the EU region. Thus, the blobmaster 204 identifies 2 available metadata clusters for the primary metadata cluster and 1 available metadata cluster for the backup metadata cluster for the US region, where each of the metadata clusters are from different failure domains in the US region. The blobmaster 204 also identifies 1 available metadata cluster for the primary metadata cluster and 1 available metadata cluster for the backup metadata cluster for the EU region, where each of the metadata clusters are from different failure domains in the EU region.

The blobmaster 204 then identifies (1410) the subset of metadata clusters as a union of the identified available metadata clusters. Continuing the example from above, the subset of metadata clusters includes the 3 metadata clusters in the US region and the 2 metadata clusters in the EU region.

Figure 15:
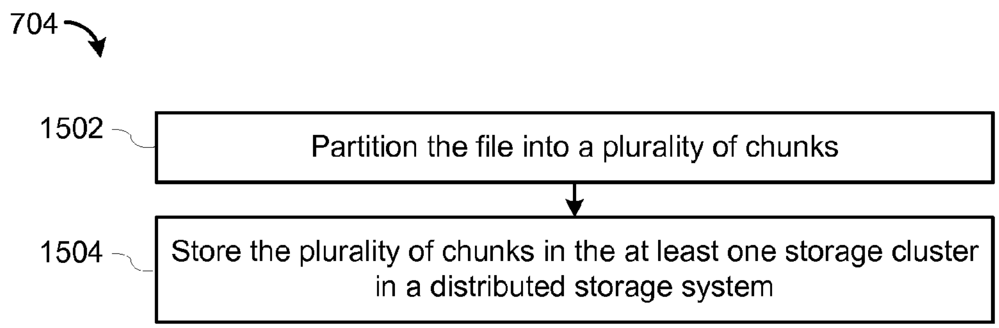
FIG. 15 is a flowchart of a method for storing a file in a storage cluster, according to some implementations.

FIG. 15 is a flowchart of a method for storing (704) a file in a storage cluster (e.g., an instance 102), according to some implementations. The bitpusher 210 partitions (1502) the file into a plurality of chunks and stores (1504) the plurality of chunks in the at least one storage cluster in a distributed storage system.

Note that although the discussion above refers to the bitpusher 210 and the blobmaster 204 of an instance 102 performing the operations illustrated in FIGS. 7-15, these operations may be performed by any module (or modules) of an instance 102 (or any other computer system).

The methods illustrated in FIGS. 7-15 may be governed by instructions that are stored in a computer readable storage medium and that are executed by at least one processor of at least one server. Each of the operations shown in FIGS. 7-15 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms “first,” “second,” etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the “first contact” are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in accordance with a determination” or “in response to detecting,” that a stated condition precedent is true, depending on the context. Similarly, the phrase “if it is determined (that a stated condition precedent is true)” or “if (a stated condition precedent is true)” or “when (a stated condition precedent is true)” may be construed to mean “upon determining” or “in response to determining” or “in accordance with a determination” or “upon detecting” or “in response to detecting” that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for storing metadata for a file in a distributed storage system, performed on a server having at least one processor and memory storing at least one program for execution by the at least one processor to perform the method, comprising:

after the file has been uploaded to at least one storage cluster in the distributed storage system:

generating metadata for the uploaded file, the metadata for the uploaded file including information identifying at least one location of the uploaded file in the at least one storage cluster in the distributed storage system;

identifying a subset of metadata clusters in the distributed storage system to form a quorum of metadata clusters, wherein the subset of metadata clusters forming the quorum includes one or more metadata clusters selected from one or more geographical regions associated with the metadata clusters in the distributed storage system; and issuing requests to store the metadata for the uploaded file on the metadata clusters in the distributed storage system, the requests including high priority requests and normal priority requests, wherein the high priority requests are requests to store the metadata for the uploaded file on at least one of the metadata clusters in the quorum of metadata clusters, and the normal priority requests are requests to store the metadata in the remaining metadata clusters, the metadata being stored on the at least one of the metadata clusters in the quorum of metadata clusters before being stored on the remaining metadata clusters in accordance with the high priority requests, such that in response to a request to obtain the uploaded file, the location of the uploaded file in the at least one storage cluster in the distributed storage system can be identified from the metadata stored on the at least one of the metadata clusters in the quorum of metadata clusters.

2. The computer-implemented method of claim 1, wherein prior to generating the metadata for the file, the method includes:

receiving a file from a client computer system; and storing the file in the at least one storage cluster in the distributed storage system.

3. The computer-implemented method of claim 1, further comprising:

receiving a first request to obtain the file from the distributed storage system;

obtaining the metadata for the file from the at least one of the metadata clusters in the quorum of metadata clusters;

identifying the at least one location of the file in the at least one storage clusters based on the metadata for the file; and obtaining the file from the at least one location of the file in the at least one storage clusters.

4. The computer-implemented method of claim 1, wherein identifying the subset of metadata clusters in the distributed storage system to form the quorum of metadata clusters includes:

grouping the metadata clusters into failure domains, a respective failure domain including metadata clusters that are likely to be concurrently unavailable;

identifying a set of the failure domains based on a first function of a hash value of an object identifier for the file, wherein the set of failure domains includes metadata clusters that are available; and identifying metadata clusters to be included in the subset of the metadata clusters from the set of the failure domains based on a second function of the hash value of the object identifier for the file.

5. The computer-implemented method of claim 4, wherein identifying the set of the failure domains based on the first function of the hash of the object identifier for the file includes:

calculating a first index value as the hash value of the object identifier for the file modulo a number of failure domains in the distributed storage system; and identifying the set of failure domains as the s consecutive failure domains that include available metadata clusters starting with the failure domain associated with the first index value, wherein s is a desired number of metadata clusters in the quorum of metadata clusters, and wherein each failure domain is associated with a respective index value.

6. The computer-implemented method of claim 4, wherein identifying metadata clusters to be included in the subset of the metadata clusters from the set of the failure domains based on the second function of the hash value of the object identifier for the file includes:

for each failure domain in the set of failure domains, calculating a second index value as the hash value of the object identifier for the file modulo a number of metadata clusters in the failure domain; and identifying an available metadata cluster in the failure domain that is associated with the second index value, wherein the available metadata cluster is included in the subset of the metadata clusters.

7. The computer-implemented method of claim 1, wherein identifying the subset of metadata clusters in the distributed storage system to form the quorum of metadata clusters includes:

grouping the metadata clusters into the one or more geographical regions; and for each geographic region of the one or more geographical regions, identifying a set of metadata clusters in the geographic region to be included in the subset of the metadata clusters based on a third function of the hash value of the object identifier for the file.

8. The computer-implemented method of claim 7, wherein identifying a respective set of metadata clusters in a respective geographic region to be included in the subset of the metadata clusters based on the third function of the hash value of the object identifier for the file includes:

calculating a third index value as the hash value of the object identifier for the file modulo a number of metadata clusters in the respective geographic region; and identifying the respective set of metadata clusters the respective geographic region as the s consecutive available metadata clusters in the respective geographic region starting with the metadata cluster associated with the third index value, wherein s is a desired number of metadata clusters in the quorum of metadata clusters for the respective geographic region, and wherein each metadata cluster in the respective geographic region is associated with a respective index value.

9. The computer-implemented method of claim 1, wherein identifying the subset of metadata clusters in the distributed storage system to form the quorum of metadata clusters includes:

grouping the metadata clusters into geographical regions;

for each geographic region, identifying primary metadata clusters and backup metadata clusters, wherein the primary metadata clusters include metadata clusters from different failure domains, wherein the backup metadata clusters include metadata clusters from different failure domains, and wherein a respective failure domain includes metadata clusters that are likely to be concurrently unavailable;

identifying x available metadata clusters in the primary metadata clusters, where x is less than or equal to a desired number, y, of metadata servers in the quorum of metadata servers for the geographic region; and identifying y−x available metadata clusters in the backup metadata clusters; and identifying the subset of metadata clusters as a union of the identified available metadata clusters.

10. The computer-implemented method of claim 1, wherein storing the file in the at least one storage cluster includes:

partitioning the file into a plurality of chunks; and storing the plurality of chunks in the at least one storage cluster in a distributed storage system.

11. The computer-implemented method of claim 1, wherein the file is stored asynchronously on the at least one storage cluster.

12. A system to store metadata for a file in a distributed storage system, comprising:

at least one processor;

memory; and at least one program stored in the memory and executable by the at least one processor, the at least one program comprising instructions to:

after the file has been uploaded to at least one storage cluster in the distributed storage system:

generate metadata for the uploaded file, the metadata for the uploaded file including information identifying at least one location of the uploaded file in the at least one storage cluster in the distributed storage system;

identify a subset of metadata clusters in the distributed storage system to form a quorum of metadata clusters, wherein the subset of metadata clusters forming the quorum includes one or more metadata clusters selected from one or more geographical regions associated with the metadata clusters in the distributed storage system; and issue requests to store the metadata for the uploaded file on the metadata clusters in the distributed storage system, the requests including high priority requests and normal priority requests, wherein the high priority requests are requests to store the metadata for the uploaded file on at least one of the metadata clusters in the quorum of metadata clusters, and the normal priority requests are requests to store the metadata in the remaining metadata clusters, the metadata being stored on the at least one of the metadata clusters in the quorum of metadata clusters before being stored on the remaining metadata clusters in accordance with the high priority requests, such that in response to a request to obtain the uploaded file, the location of the uploaded file in the at least one storage cluster in the distributed storage system can be identified from the metadata stored on the at least one of the metadata clusters in the quorum of metadata clusters.

13. The system of claim 12, wherein prior to generating the metadata for the file, the at least one program includes instructions to:

receive a file from a client computer system; and store the file in the at least one storage cluster in the distributed storage system.

14. The system of claim 12, further comprising instructions to:

receive a first request to obtain the file from the distributed storage system;

obtain the metadata for the file from the at least one of the metadata clusters in the quorum of metadata clusters;

identify the at least one location of the file in the at least one storage clusters based on the metadata for the file; and obtain the file from the at least one location of the file in the at least one storage clusters.

15. The system of claim 12, wherein the instructions to identify the subset of metadata clusters in the distributed storage system to form the quorum of metadata clusters include instructions to:

group the metadata clusters into failure domains, a respective failure domain including metadata clusters that are likely to be concurrently unavailable;

identify a set of the failure domains based on a first function of a hash value of an object identifier for the file, wherein the set of failure domains includes metadata clusters that are available; and identify metadata clusters to be included in the subset of the metadata clusters from the set of the failure domains based on a second function of the hash value of the object identifier for the file.

16. The system of claim 15, wherein the instructions to identify the set of the failure domains based on the first function of the hash of the object identifier for the file include instructions to:

calculate a first index value as the hash value of the object identifier for the file modulo a number of failure domains in the distributed storage system; and identify the set of failure domains as the s consecutive failure domains that include available metadata clusters starting with the failure domain associated with the first index value, wherein s is a desired number of metadata clusters in the quorum of metadata clusters, and wherein each failure domain is associated with a respective index value.

17. The system of claim 15, wherein the instructions to identify metadata clusters to be included in the subset of the metadata clusters from the set of the failure domains based on the second function of the hash value of the object identifier for the file include instructions to:

for each failure domain in the set of failure domains, calculate a second index value as the hash value of the object identifier for the file modulo a number of metadata clusters in the failure domain; and identify an available metadata cluster in the failure domain that is associated with the second index value, wherein the available metadata cluster is included in the subset of the metadata clusters.

18. The system of claim 12, wherein the instructions to identify the subset of metadata clusters in the distributed storage system to form the quorum of metadata clusters include instructions to:

group the metadata clusters into the one or more geographical regions; and for each geographic region of the one or more geographical regions, identify a set of metadata clusters in the geographic region to be included in the subset of the metadata clusters based on a third function of the hash value of the object identifier for the file.

19. The system of claim 18, wherein the instructions to identify a respective set of metadata clusters in a respective geographic region to be included in the subset of the metadata clusters based on the third function of the hash value of the object identifier for the file include instructions to:

calculate a third index value as the hash value of the object identifier for the file modulo a number of metadata clusters in the respective geographic region; and identify the respective set of metadata clusters the respective geographic region as the s consecutive available metadata clusters in the respective geographic region starting with the metadata cluster associated with the third index value, wherein s is a desired number of metadata clusters in the quorum of metadata clusters for the respective geographic region, and wherein each metadata cluster in the respective geographic region is associated with a respective index value.

20. The system of claim 12, wherein the instructions to identify the subset of metadata clusters in the distributed storage system to form the quorum of metadata clusters include instructions to:

group the metadata clusters into geographical regions;

for each geographic region, identify primary metadata clusters and backup metadata clusters, wherein the primary metadata clusters include metadata clusters from different failure domains, wherein the backup metadata clusters include metadata clusters from different failure domains, and wherein a respective failure domain includes metadata clusters that are likely to be concurrently unavailable;

identify x available metadata clusters in the primary metadata clusters, where x is less than or equal to a desired number, y, of metadata servers in the quorum of metadata servers for the geographic region; and identify y−x available metadata clusters in the backup metadata clusters; and identify the subset of metadata clusters as a union of the identified available metadata clusters.

21. The system of claim 12, wherein the instructions to store the file in the at least one storage cluster include instructions to:

partition the file into a plurality of chunks; and store the plurality of chunks in the at least one storage cluster in a distributed storage system.

22. The system of claim 12, wherein the file is stored asynchronously on the at least one storage cluster.

23. A non-transitory computer readable storage medium storing at least one program configured for execution by at least one processor of a computer system, the at least one program comprising instructions to:

after the file has been uploaded to at least one storage cluster in the distributed storage system:

generate metadata for the uploaded file, the metadata for the uploaded file including information identifying at least one location of the uploaded file in the at least one storage cluster in the distributed storage system;

identify a subset of metadata clusters in the distributed storage system to form a quorum of metadata clusters, wherein the subset of metadata clusters forming the quorum includes one or more metadata clusters selected from one or more geographical regions associated with the metadata clusters in the distributed storage system; and issue requests to store the metadata for the uploaded file on the metadata clusters in the distributed storage system, the requests including high priority requests and normal priority requests, wherein the high priority requests are requests to store the metadata for the uploaded file on at least one of the metadata clusters in the quorum of metadata clusters, and the normal priority requests are requests to store the metadata in the remaining metadata clusters, the metadata being stored on the at least one of the metadata clusters in the quorum of metadata clusters before being stored on the remaining metadata clusters in accordance with the high priority requests, such that in response to a request to obtain the uploaded file, the location of the uploaded file in the at least one storage cluster in the distributed storage system can be identified from the metadata stored on the at least one of the metadata clusters in the quorum of metadata clusters.

* * * * *